US012315982B2

(12) United States Patent
Furutani

(10) Patent No.: US 12,315,982 B2
(45) Date of Patent: May 27, 2025

(54) DIRECTIONAL COUPLER, HIGH-FREQUENCY MODULE, AND COMMUNICATION DEVICE

(71) Applicant: Murata Manufacturing Co., Ltd., Kyoto (JP)

(72) Inventor: Koji Furutani, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 235 days.

(21) Appl. No.: 18/060,624

(22) Filed: Dec. 1, 2022

(65) Prior Publication Data

US 2023/0216171 A1 Jul. 6, 2023

(30) Foreign Application Priority Data

Jan. 5, 2022 (JP) ................................ 2022-000734

(51) Int. Cl.
*H01P 5/18* (2006.01)

(52) U.S. Cl.
CPC .............. *H01P 5/187* (2013.01); *H01P 5/188* (2013.01)

(58) Field of Classification Search
CPC ............. H01P 5/188; H01P 5/187; H01P 5/18
USPC ........................................................ 333/116
See application file for complete search history.

(56) References Cited

U.S. PATENT DOCUMENTS 5,818,308 A 10/1998 Tanaka et al.
6,771,141 B2 * 8/2004 Iida ......................... H01P 5/185 333/116
6,928,298 B2 * 8/2005 Furutani .............. H04B 1/0053 455/553.1
7,605,676 B2 * 10/2009 Dabrowski ............. H01P 5/185 333/116
9,748,627 B2 * 8/2017 Sun ........................... H01P 5/18
10,892,538 B2 * 1/2021 Hanaoka ................. H01P 5/184
11,121,444 B2 * 9/2021 Seki ........................ H04B 1/006
2003/0030994 A1 * 2/2003 Takaya ................ H01F 17/0006 361/728
2007/0120621 A1 5/2007 Kirkeby
2020/0212529 A1 * 7/2020 Matsumoto ............... H01P 1/15
(Continued)

FOREIGN PATENT DOCUMENTS

JP H09-199914 A 7/1997
JP 2009-508409 A 2/2009
(Continued)

*Primary Examiner* — Andrea Lindgren Baltzell
*Assistant Examiner* — Abigail Amir Yaldo
(74) *Attorney, Agent, or Firm* — McDonald Hopkins LLC

(57) ABSTRACT

A directional coupler includes a main line, sub lines, and a multilayer substrate. The multilayer substrate includes dielectric layers. The multilayer substrate has a first and a second principal surface. The main line, the first, second, and third sub lines are each formed in a looped shape in plan view from a thickness direction of the multilayer substrate, and are provided to different dielectric layers among the dielectric layers. The first, second, and third sub lines have first distances different from each other. Among the first, second sub line, and third sub lines, the longest sub line having the longest first distance and the shortest sub line having the shortest first distance are disposed on the first principal surface of the main line, and the intermediate sub line having the intermediate first distance is disposed on the second principal surface of the main line.

13 Claims, 14 Drawing Sheets

(56) References Cited

U.S. PATENT DOCUMENTS

| | | | | |
|---|---|---|---|---|
| 2020/0335845 | A1* | 10/2020 | Tomita | H04Q 11/00 |
| 2020/0335846 | A1* | 10/2020 | Kim | H01P 5/185 |
| 2021/0036395 | A1* | 2/2021 | Seki | H01G 4/40 |
| 2021/0036396 | A1 | 2/2021 | Seki et al. | |
| 2021/0098854 | A1* | 4/2021 | Tokuda | H01P 5/187 |

FOREIGN PATENT DOCUMENTS

| | | | | |
|---|---|---|---|---|
| JP | 2011082797 | A | * | 4/2011 |
| JP | 6337879 | B2 | * | 6/2018 |
| JP | 2021-027426 | A | | 2/2021 |

* cited by examiner

DIRECTIONAL COUPLER, HIGH-FREQUENCY MODULE, AND COMMUNICATION DEVICE

CROSS REFERENCE TO RELATED APPLICATION

This application claims priority from Japanese Patent Application No. 2022-000734 filed on Jan. 5, 2022. The content of this application is incorporated herein by reference in its entirety.

BACKGROUND ART

The present disclosure relates to a directional coupler, a high-frequency module, and a communication device.

A directional coupler described in Japanese Unexamined Patent Application Publication No. 2021-27426 is provided with a main line, three sub lines (first to third sub lines), and a mounting substrate (a multilayer substrate) having a multilayered structure. The main line and the three sub lines are provided to the mounting substrate. Two of the three sub lines are disposed to have the main line therebetween. Therefore, while electromagnetic-field coupling between the main line and the two sub lines being improved, electromagnetic-field coupling between the two sub lines is suppressed.

BRIEF SUMMARY

However, Japanese Unexamined Patent Application Publication No. 2021-27426 does not describe the layout of the third sub line among the three sub lines on the mounting substrate to suppress the electromagnetic-field coupling with the above-mentioned two sub lines while increasing the electromagnetic-field coupling with the main line. Therefore, in Japanese Unexamined Patent Application Publication No. 2021-27426, it is difficult to suppress the electromagnetic-field coupling between the three sub lines.

The present disclosure provides a directional coupler, a high-frequency module, and a communication device capable of suppressing electromagnetic-field coupling between first to third sub lines, while improving electromagnetic-field coupling between a main line and the first to third sub lines.

A directional coupler according to an aspect of the present disclosure includes a main line, a first sub line, a second sub line, a third sub line, and a multilayer substrate. The multilayer substrate includes a plurality of dielectric layers. The multilayer substrate has a first principal surface and a second principal surface opposed to each other. The first sub line and the second sub line are connected to each other in series. The second sub line and the third sub line are connected to each other in series. Each of the main line, the first sub line, the second sub line, and the third sub line includes a line portion formed in a looped shape in plan view from a thickness direction of the multilayer substrate. The line portions of the main line, the first sub line, the second sub line, and the third sub line are respectively provided to different dielectric layers among the plurality of dielectric layers. In each of the first sub line, the second sub line, and the third sub line, a longest distance among distances from an outer periphery to a center of gravity thereof is a first distance. The first sub line, the second sub line, and the third sub line respectively have the first distances different from each other, the first distances being a longest distance, an intermediate distance, and a shortest distance. Among the first sub line, the second sub line, and the third sub line, a longest sub line having the longest first distance and a shortest sub line having the shortest first distance are disposed on a first principal surface side of the main line, and an intermediate sub line having the intermediate first distance is disposed on a second principal surface side of the main line.

A high-frequency module according to an aspect of the present disclosure includes the above-described directional coupler, an antenna terminal, and a signal path. The signal path leads to the antenna terminal. The main line of the directional coupler constitutes a partial section of the signal path.

A high-frequency module according to an aspect of the present disclosure includes the above-described directional coupler, an antenna terminal, a plurality of filters, and a second switch. The second switch is configured to switch connection and disconnection between a first signal path leading to the antenna terminal and each of a plurality of second signal paths respectively leading to the plurality of filters. The IC chip further includes the second switch.

A communication device according to an aspect of the present disclosure includes the above-described high-frequency module and a signal processing circuit. The signal processing circuit is connected to the high-frequency module and is configured to process a high-frequency signal.

The directional coupler, the high-frequency module, and the communication device according to the above aspects of the present disclosure can suppress the electromagnetic-field coupling between the first to third sub lines while improving the electromagnetic-field coupling between the main line and the first to third sub lines.

DETAILED DESCRIPTION

Figure 1:
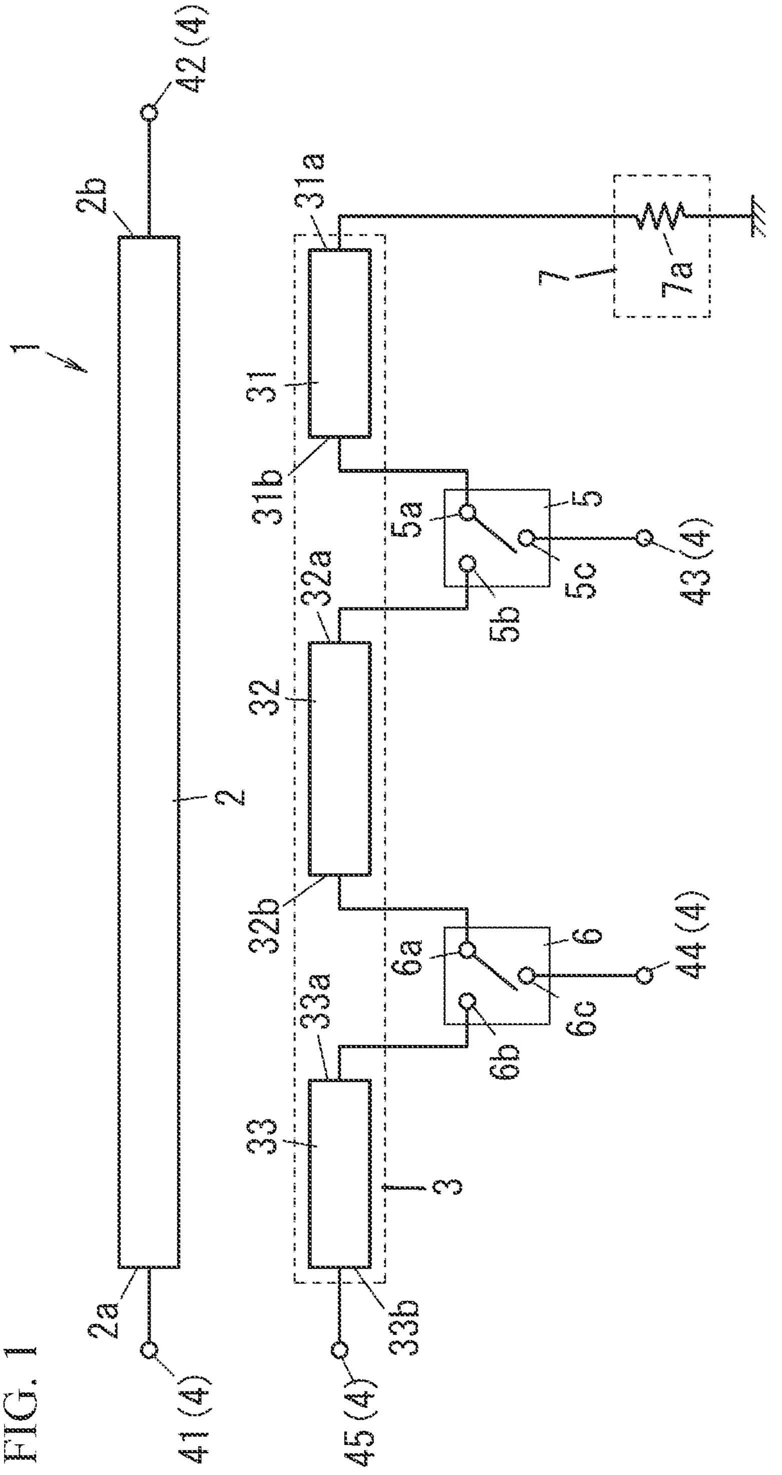
FIG. 1 is an equivalent circuit diagram of a directional coupler according to Embodiment 1.

Hereinafter, a directional coupler, a high-frequency module, and a communication device according to embodiments are described with reference to the drawings. Note that, in terms of components described herein and illustrated in the drawings, the size, the thickness, and their dimensional relations described and illustrated herein or in the drawings are merely examples, and are not limited to the examples described and illustrated herein or in the drawings.

Embodiment 1

(1) Equivalent Circuit of Directional Coupler

An equivalent circuit of a directional coupler 1 according to Embodiment 1 is described with reference to FIG. 1.

The directional coupler 1 is used for a high-frequency module of a communication device, for example. As illustrated in FIG. 1, the directional coupler 1 is a device which extracts, as a detection signal, a part of high-frequency signals flowing in a partial section (a main line 2) of a signal path in the high-frequency module, from a sub line 3 which is electromagnetic-field coupled with the main line 2. The high-frequency signals flowing in the main line 2 can be monitored through the monitoring of the detection signal. The directional coupler 1 of this embodiment is capable of dealing with high-frequency signals in a plurality of frequency bands by making a line length of the sub line 3 changeable between multiple stages (for example, three stages).

The directional coupler 1 includes the main line 2, the sub line 3, a plurality of ports 4, two switches 5 and 6, and a termination circuit 7. The switches 5 and 6 are referred to below as first switches 5 and 6.

The plurality of ports 4 include an input port 41, an output port 42, and three coupling ports (a first coupling port 43, a second coupling port 44, and a third coupling port 45). The input port 41 is a port used for inputting high-frequency signals from outside into the main line 2. The output port 42 is a port used for outputting the high-frequency signals outside from the main line 2. The three coupling ports (the first coupling port 43, the second coupling port 44, and the third coupling port 45) are ports used for outputting a detection signal outside from the sub line 3. The first coupling port 43 is a coupling port used when the line length of the sub line 3 is the shortest, the second coupling port 44 is a coupling port used when the line length of the sub line 3 is an intermediate length, and the third coupling port 45 is a coupling port used when the line length of the sub line 3 is the longest.

The termination circuit 7 is a circuit which terminates one end of the sub line 3. The termination circuit 7 is connected between one end of the sub line 3 and the ground. The termination circuit 7 includes, for example, a resistor 7*a*.

The main line 2 is a line where high-frequency signals which are detection targets flow. The main line 2 includes a first end 2*a* and a second end 2*b*. The first end 2*a* of the main line 2 is connected to the input port 41. The second end 2*b* of the main line 2 is connected to the output port 42.

The sub line 3 is electromagnetic-field coupled with the main line 2, and is a line which extracts a part of the high-frequency signals flowing in the main line 2 as a detection signal. The sub line 3 includes three sub lines (a first sub line 31, a second sub line 32, and a third sub line 33). For example, at least two of the three sub lines have respectively different line lengths. In this embodiment, all the three sub lines have respectively different line lengths. For example, a line length of the second sub line 32 is the longest, a line length of the first sub line 31 is the shortest, and a line length of the third sub line 33 is an intermediate length between the line length of the first sub line 31 and the line length of the second sub line 32.

The first sub line 31 includes a first end 31*a* and a second end 31*b*. The first end 31*a* of the first sub line 31 is connected to the ground with the termination circuit 7 interposed therebetween. The second end 31*b* of the first sub line 31 is connected to a common terminal 5*a* (described later) of the first switch 5. The second sub line 32 includes a first end 32*a* and a second end 32*b*. The first end 32*a* of the second sub line 32 is connected to a selection terminal 5*b* of the first switch 5. The second end 32*b* of the second sub line 32 is connected to a common terminal 6*a* (described later) of the first switch 6. The third sub line 33 includes a first end 33*a* and a second end 33*b*. The first end 33*a* of the third sub line 33 is connected to a selection terminal 6*b* (described later) of the first switch 6. The second end 33*b* of the third sub line 33 is connected to the third coupling port 45. The first sub line 31 and the second sub line 32 are connected in series with the first switch 5 interposed therebetween. The second sub line 32 and the third sub line 33 are connected in series with the second switch 6 interposed therebetween.

The first switches 5 and 6 are line length selector switches which switch the line length of the sub line 3 to multiple stages (for example, three stages). Each of the first switches 5 and 6 is made of, for example, a switching IC. The first switch 5 is connected between the two adjacent sub lines (the first sub line 31 and the second sub line 32) among the three sub lines (the first sub line 31, the second sub line 32, and the third sub line 33) described above. The first switch 6 is connected between the two adjacent sub lines (the second sub line 32 and the third sub line 33) among the three sub lines described above.

More specifically, the first switch 5 includes one common terminal 5*a* and two selection terminals 5*b* and 5*c*. The common terminal 5*a* is selectively connectable to one of the two selection terminals 5*b* and 5*c*. The common terminal 5*a* is connected to the second end 31*b* of the first sub line 31. The selection terminal 5*b* is connected to the first end 32*a* of the second sub line 32. The selection terminal 5*c* is connected to the first coupling port 43. The first switch 6 includes one common terminal 6*a* and two selection terminals 6*b* and 6*c*. The common terminal 6*a* is selectively connectable to one of the two selection terminals 6*b* and 6*c*. The common terminal 6*a* is connected to the second end 32*b* of the second sub line 32. The selection terminal 6*b* is connected to the first end 33*a* of the third sub line 33. The selection terminal 6*c* is connected to the second coupling port 44.

In the directional coupler 1, by switching connection destinations of the common terminals 5*a* and 6*a* of the first switches 5 and 6, one or more sub line(s) which function(s) as the sub line 3 is selected among the three sub lines (the first sub line 31, the second sub line 32, and the third sub line 33). Furthermore, one coupling port which functions as the coupling port is selected among the three coupling ports (the first to third coupling ports 43 to 45) described above. That is, the one or more sub line(s) selected by the first switches 5 and 6 is/are connected in series between the one coupling port selected by the first switches 5 and 6 and the termination circuit 7. Therefore, the selected one or more sub line(s) function(s) as the sub line 3, and the not-selected sub line does not function as the sub line 3. Moreover, the selected coupling port functions as the coupling port, and the not-selected coupling port does not function as the coupling port.

Here, the line length of the sub line 3 is the sum of the respective line lengths of the one or more sub line(s) which function(s) as the sub line 3 among the three sub lines. That is, the line length of the sub line 3 is switchable to multiple stages (for example, three stages) by the first switches 5 and 6.

In the directional coupler 1, the line length of the sub line 3 is switchable to three stages. When the line length of the sub line 3 is the longest, the directional coupler 1 can deal with a high-frequency signal in a low-frequency band (low band). A mode of the directional coupler 1 in this case is referred to below as a low band (LB) mode. Further, when the line length of the sub line 3 is the shortest, the directional coupler 1 can deal with a high-frequency signal in a high-frequency band (high band). A mode of the directional coupler 1 in this case is referred to as a middle band (MB) mode. Further, when the line length of the sub line 3 is the intermediate length, the directional coupler 1 can deal with a high-frequency signal in an intermediate-frequency band (middle band). A mode of the directional coupler 1 in this case is referred to as a high band (HB) mode. That is, the directional coupler 1 has the three modes (the LB mode, the MB mode, and the HB mode) corresponding to the line lengths of the sub line 3.

(2) Details of Three Modes of Directional Coupler

The three modes of the directional coupler are described in detail with reference to FIGS. 2 to 4. The directional coupler 1 has the three modes (the LB mode, the MB mode, and the HB mode).

Figure 2:
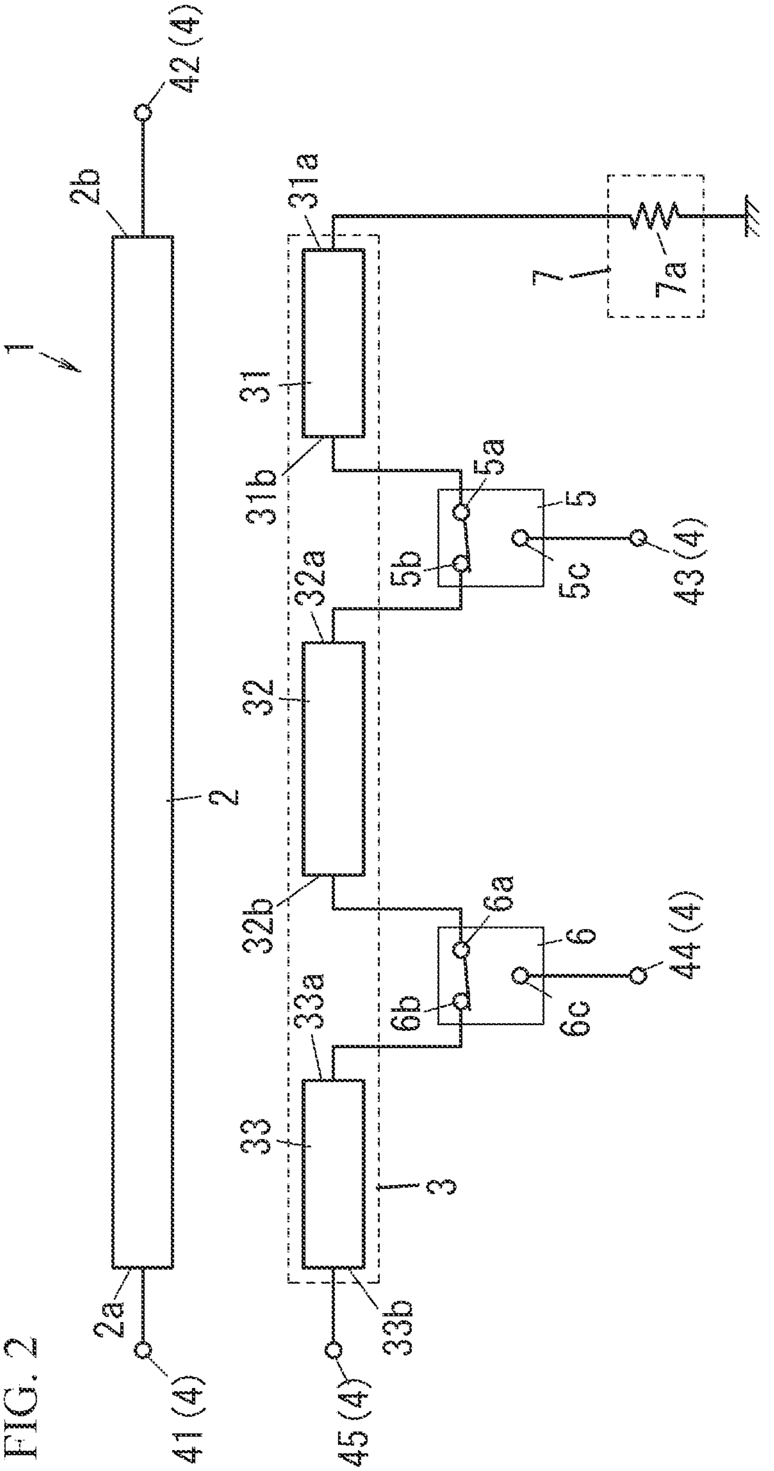
FIG. 2 is an equivalent circuit diagram illustrating an LB mode of the directional coupler.

As illustrated in FIG. 2, when the directional coupler 1 is in the LB mode, the common terminal 5*a* of the first switch 5 is connected to the selection terminal 5*b*, and the common terminal 6*a* of the first switch 6 is connected to the selection terminal 6*b*. In this case, all of the three sub lines (the first sub line 31, the second sub line 32, and the third sub line 33) are connected in series to function as the sub line 3. Further, among the three coupling ports (the first coupling port 43, the second coupling port 44, and the third coupling port 45), the third coupling port 45 is selected, and the selected third coupling port 45 functions as the coupling port. The line length of the sub line 3 in this case is the sum of the line lengths of the three sub lines, and becomes the longest line length among the switchable line lengths of the sub line 3.

Figure 3:
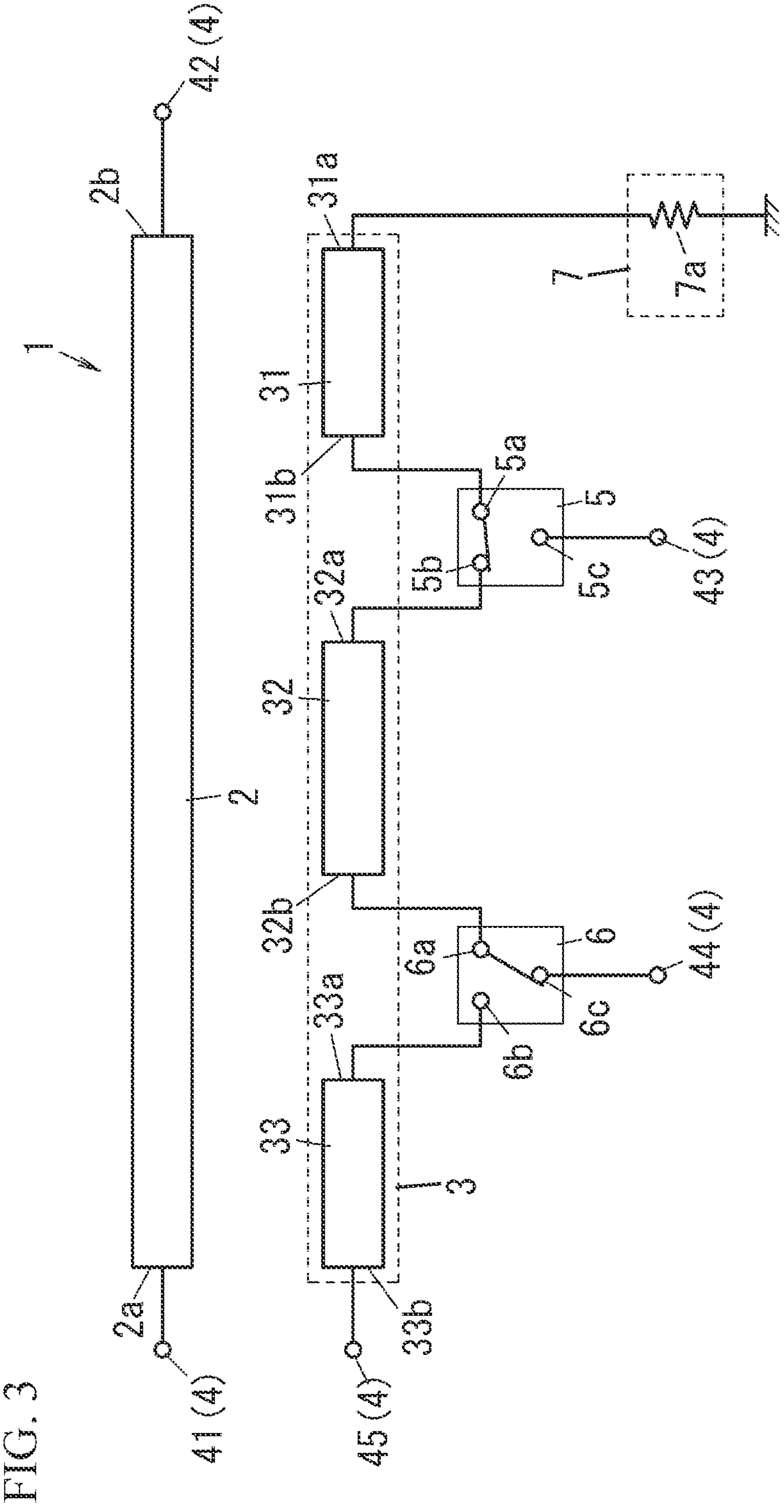
FIG. 3 is an equivalent circuit diagram illustrating an MB mode of the directional coupler.

As illustrated in FIG. 3, when the directional coupler 1 is in the MB mode, the common terminal 5*a* of the first switch 5 is connected to the selection terminal 5*b*, and the common terminal 6*a* of the first switch 6 is connected to the selection terminal 6*c*. In this case, the two sub lines (the first sub line 31 and the second sub line 32) among the three sub lines are connected in series to function as the sub line 3. Further, among the three coupling ports, the second coupling port 44 is selected, and the selected second coupling port 44 functions as the coupling port. The line length of the sub line 3 in this case is the sum of the line lengths of the above-mentioned two sub lines, and becomes the intermediate line length among the switchable line lengths of the sub line 3.

Figure 4:
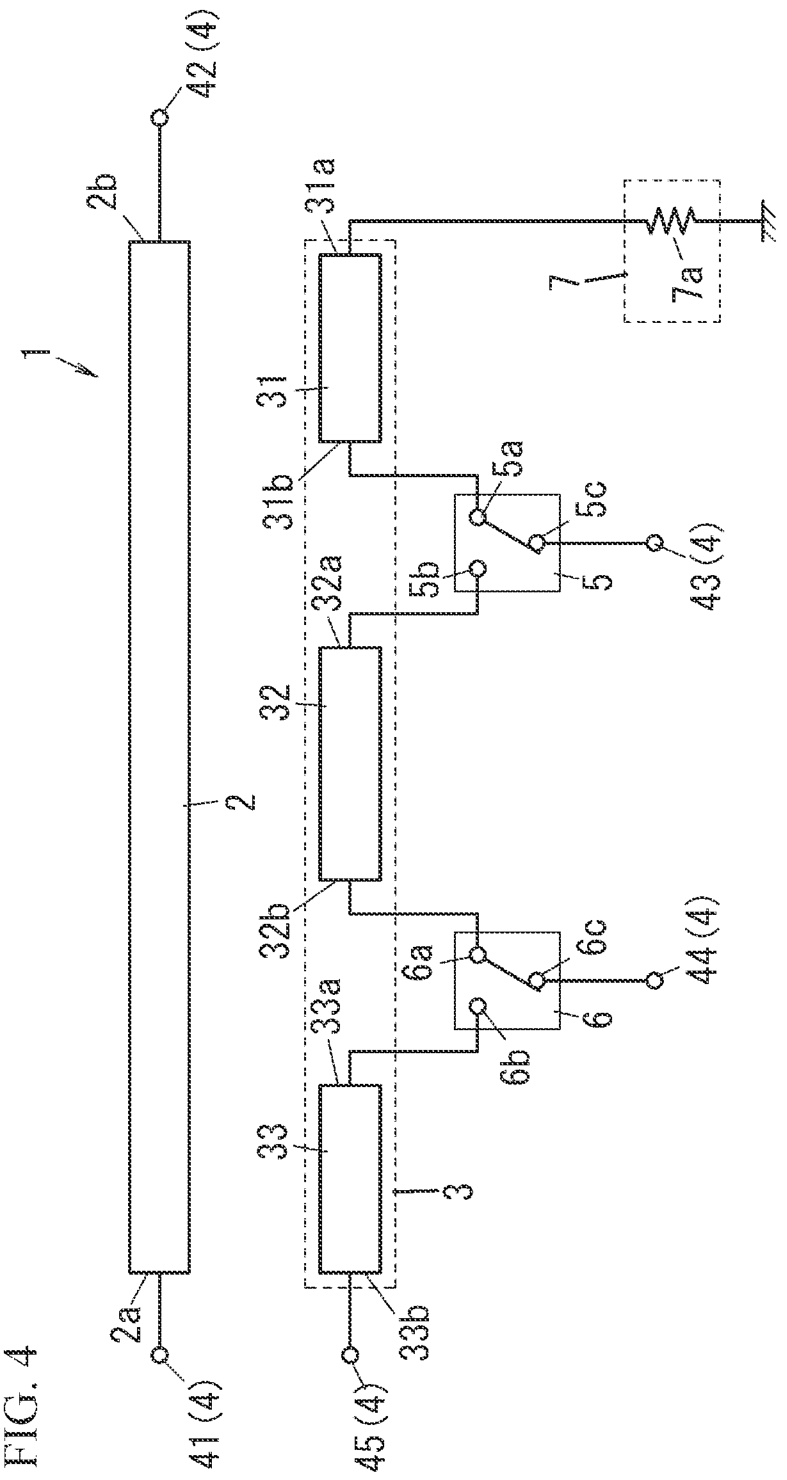
FIG. 4 is an equivalent circuit diagram illustrating an HB mode of the directional coupler.

As illustrated in FIG. 4, when the directional coupler 1 is in the HB mode, the common terminal 5*a* of the first switch 5 is connected to the selection terminal 5*c*, and the common terminal 6*a* of the first switch 6 is connected to the selection terminal 6*c*. In this case, the first sub line 31 among the three sub lines is selected to function as the sub line 3. Further, among the three coupling ports, the first coupling port 43 is selected, and the selected first coupling port 43 functions as the coupling port. The line length of the sub line 3 in this case is the line length of the first sub line 31, and becomes the shortest line length among the switchable line lengths of the sub line 3.

(3) Configuration of Directional Coupler

Figure 5:
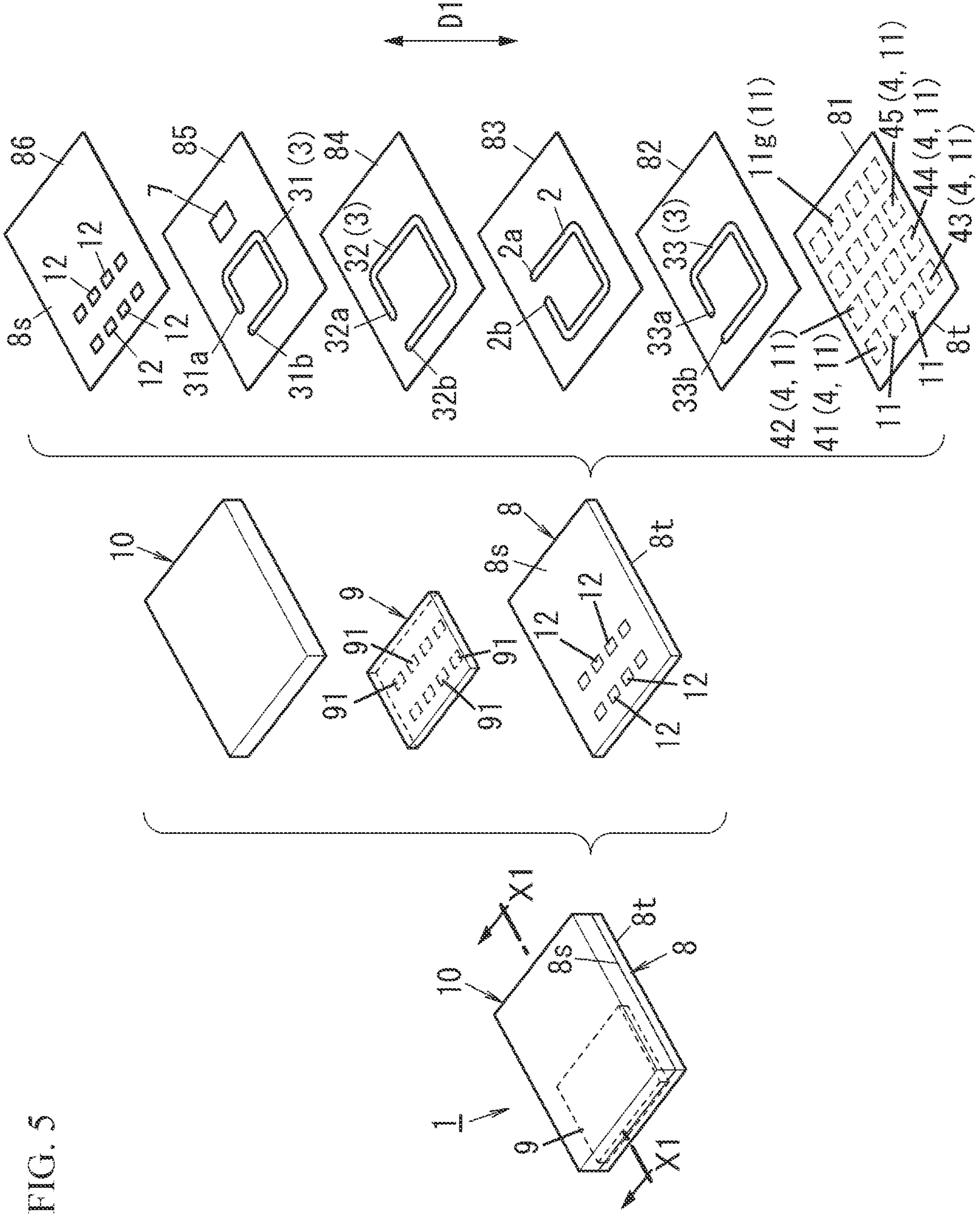
FIG. 5 is a configuration diagram illustrating one example of a configuration of the directional coupler.

A configuration of the directional coupler 1 is described in detail with reference to FIGS. 5 and 6. As illustrated in FIG. 5, the directional coupler 1 includes a multilayer substrate 8, an IC chip 9, and a resin member 10, in addition to the main line 2, the sub line 3 (the first to third sub lines 31 to 33), the plurality of ports 4 (the input port 41, the output port 42, and the first to third coupling ports 43 to 45), and the termination circuit 7 which are described above.

The multilayer substrate 8 is a substrate to which the main line 2, the sub line 3, the plurality of ports 4, and the termination circuit 7 are provided. The multilayer substrate 8 includes a plurality of (in the example of FIG. 5, six) dielectric layers 81 to 86 laminated onto each other. The main line 2 and the first to third sub lines 31 to 33 are respectively provided to different dielectric layers among the plurality of dielectric layers 81 to 86. The multilayer substrate 8 includes a first principal surface 8*s* and a second principal surface 8*t* opposed to each other.

The multilayer substrate 8 is further provided with a plurality of outer connection electrodes 11, a plurality of electrode pads 12, and a plurality of wiring conductors (not illustrated). The plurality of outer connection electrodes 11 include the plurality of ports 4 and a ground electrode 11*g*. The ground electrode 11*g* is an electrode with its potential kept at a ground potential. The outer connection electrode 11 is an electrode which is electrically connected to an outer circuit (for example, a high-frequency module). The plurality of electrode pads 12 are electrodes which are electrically connected to the IC chip 9. The plurality of wiring conductors are conductors which electrically connect the main line 2, the sub line 3, the plurality of ports 4, the termination circuit 7, the outer connection electrodes 11, and the electrode pads 12 so as to satisfy a given connection relationship (in detail, the equivalent circuit of the directional coupler 1). Each of the plurality of wiring conductors is made of at least one of a via conductor (not illustrated) and a patterned conductor (not illustrated). The via conductors are provided to penetrate the dielectric layers 81 to 86 in the thickness direction, respectively. The patterned conductors are pattern-formed on at least one of both-side principal surfaces of the dielectric layers 81 to 86, respectively.

The dielectric layers 81 to 85 may be formed by a single material, such as a bismaleimide triazine (BT) resin, an epoxy resin, a polyphenylene ether resin, a fluorine resin, a liquid crystal polymer resin, and a polyimide resin, or a mixed material of the single material and glass fiber and another filler. Alternatively, the dielectric layers 81 to 85 may be formed by using ceramics, such as low temperature co-fired ceramics (LTCC) and high temperature co-fired ceramics (HTCC). Further, the conductors, such as the main line 2, the sub line 3, and the wiring conductors are formed by a copper film, a thick film made of copper or silver, or an alloy film or composite film made of copper, silver, and another metal.

Each of the plurality of dielectric layers 81 to 86 has a first principal surface and a second principal surface. The first principal surface of each of the dielectric layers 81 to 86 is a principal surface on the side of the first principal surface 8*s* of the multilayer substrate 8. The second principal surface of each of the dielectric layers 81 to 86 is a principal surface on the side of the second principal surface 8*t* of the multilayer substrate 8. The second principal surface of the dielectric layer 81 is provided with the plurality of outer connection electrodes 11. The first principal surface of the dielectric layer 82 is provided with the third sub line 33. The first principal surface of the dielectric layer 83 is provided with the main line 2. The first principal surface of the dielectric layer 84 is provided with the second sub line 32. The first principal surface of the dielectric layer 85 is provided with the first sub line 31 and the termination circuit 7. The first principal surface of the dielectric layer 86 is provided with the plurality of electrode pads 12.

Note that, as the termination circuit 7, a capacitor or an inductor, or a circuit combining them may be used other than a resistor. Components of the termination circuit 7 may be provided to the first principal surfaces of the plurality of dielectric layers including the dielectric layer 85, or the termination circuit 7 may be provided as a chip component to the first principal surface 8*s* of the multilayer substrate 8.

The first end 2*a* of the main line 2 is connected to the input port 41 with the wiring conductor interposed therebetween, and the second end 2*b* of the main line 2 is connected to the output port 42 with the wiring conductor interposed therebetween. The first end 31*a* of the first sub line 31 is connected to the termination circuit 7 with the wiring conductor interposed therebetween. The termination circuit 7 is connected to the ground electrode 11*g* with the wiring conductor interposed therebetween. Each of the second end 31*b* of the first sub line 31, the first end 32*a* and the second end 32*b* of the second sub line 32, and the first end 33*a* of the third sub line 33 is connected to a determined electrode pad among the plurality of electrode pads 12. The second end 33*b* of the third sub line 33 is connected to the third coupling port 45 with the wiring conductor interposed therebetween. Each of the first coupling port 43 and the second coupling port 44 is connected to a determined electrode pad 12 among the plurality of electrode pads 12.

The integrated circuit (IC) chip 9 is a semiconductor IC including therein the first switches 5 and 6 and a control circuit. The control circuit controls the connection destinations of the common terminals 5*a* and 6*a* of the first switches 5 and 6 in accordance with the control signal from outside. The IC chip 9 includes therein the six terminals (the three terminals 5*a* to 5*c* of the first switch 5 and the three terminals 6*a* to 6*c* of the first switch 6). That is, the IC chip 9 includes the first switch 5. In other words, the IC chip 9 is formed integrally with the first switch 5. The IC chip 9 is in a rectangular plate-like shape, for example, and has a first principal surface and a second principal surface. The first principal surface of the IC chip 9 is a principal surface on the side of the first principal surface 8*s* of the multilayer substrate 8. The second principal surface of the IC chip 9 is a principal surface on the side of the second principal surface 8*t* of the multilayer substrate 8. The IC chip 9 includes a plurality of electrode pads 91. The plurality of electrode pads 91 are conductors which are electrically connected to the plurality of electrode pads 12 of the multilayer substrate 8. The six terminals 5*a* to 5*c* and 6*a* to 6*c* inside the IC chip 9 are electrically connected to the determined electrode pads among the plurality of electrode pads 91, respectively.

Figure 6:
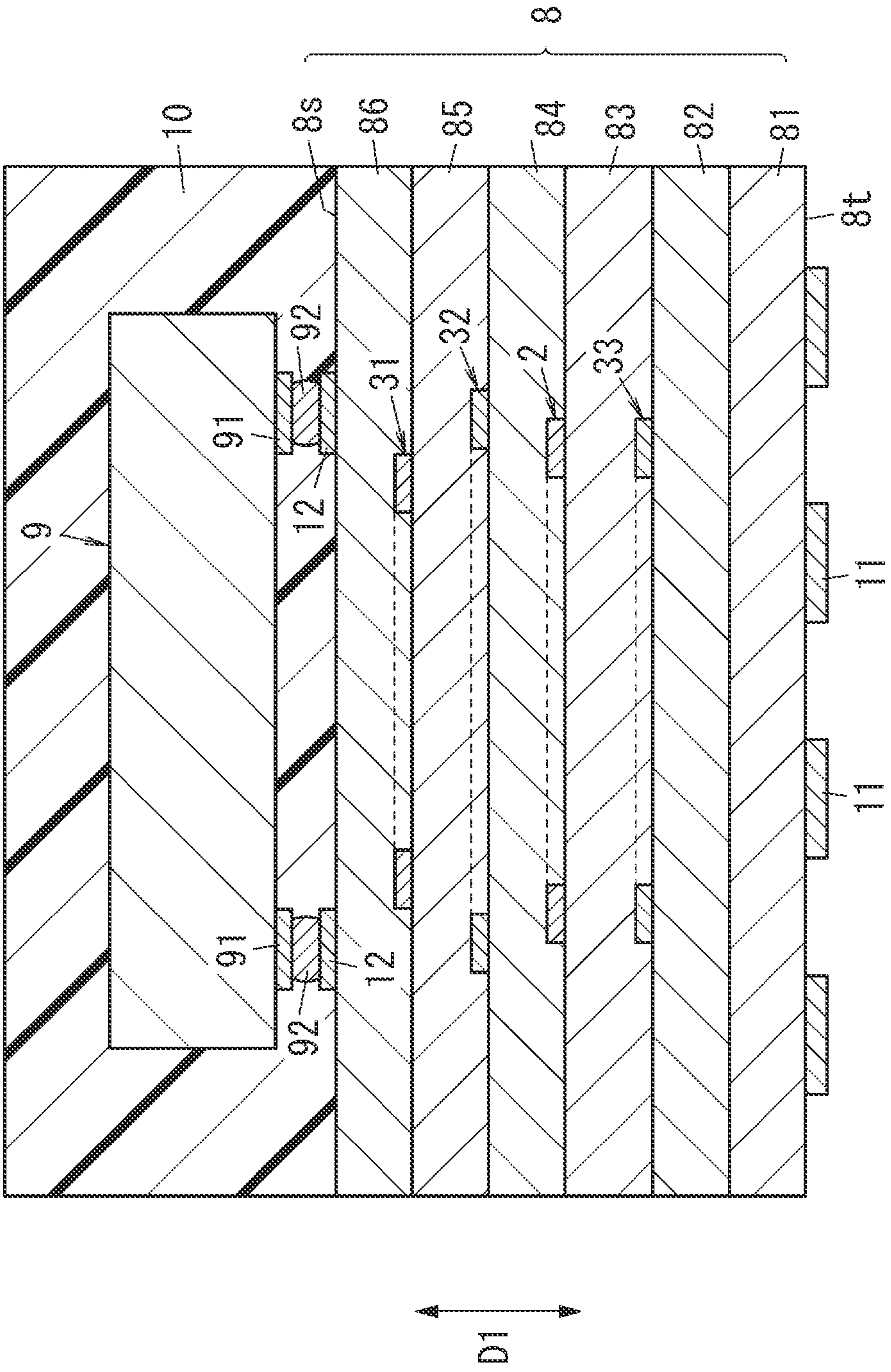
FIG. 6 is a sectional view taken along a line X1-X1 in FIG. 5.

The IC chip 9 is provided to one of the first principal surface 8*s* and the second principal surface 8*t* of the multilayer substrate 8 (see FIG. 6, where the IC chip 9 is provided to the first principal surface 8*s*). The plurality of electrode pads 91 of the IC chip 9 are electrically connected to the plurality of electrode pads 12 of the multilayer substrate 8 so as to satisfy a given connection relationship (in detail, the equivalent circuit of the directional coupler 1). In this embodiment, the IC chip 9 is provided to the first principal surface 8*s* of the multilayer substrate 8, and the plurality of electrode pads 91 of the IC chip 9 are connected to the plurality of electrode pads 12 by solder bumps 92 (see FIG. 6).

In this directional coupler 1, each of the main line 2, the first sub line 31, the second sub line 32, and the third sub line 33 at least partially overlaps with the IC chip 9 in plan view from a thickness direction D1 (see FIG. 6). In the example of FIG. 6, the entire portion of each of the main line 2, the first sub line 31, the second sub line 32, and the third sub line 33 overlaps with the IC chip 9. Therefore, the wiring conductor connecting the IC chip 9 and each of the lines (the main line 2, the first sub line 31, the second sub line 32, and the third sub line 33) can be shortened. As a result, occurrence of optional inductor in the wiring conductor connecting the IC chip 9 and to line can be suppressed.

The resin member 10 is a resin member covering the IC chip 9, and is provided to one end surface 8*s* of the multilayer substrate 8 so as to entirely cover the IC chip 9. The resin member 10 is, for example, an epoxy resin. Note that, as the resin member 10, an underfill resin of the IC chip 9 may be used together. Further, a metal shielding film may be formed on at least a portion of a top surface and a side surface of the resin member 10.

(4) Details of Main Line and Sub Line

The main line 2, the first sub line 31, the second sub line 32, and the third sub line 33 are described in detail with reference to FIGS. 7 to 10.

Figure 7:
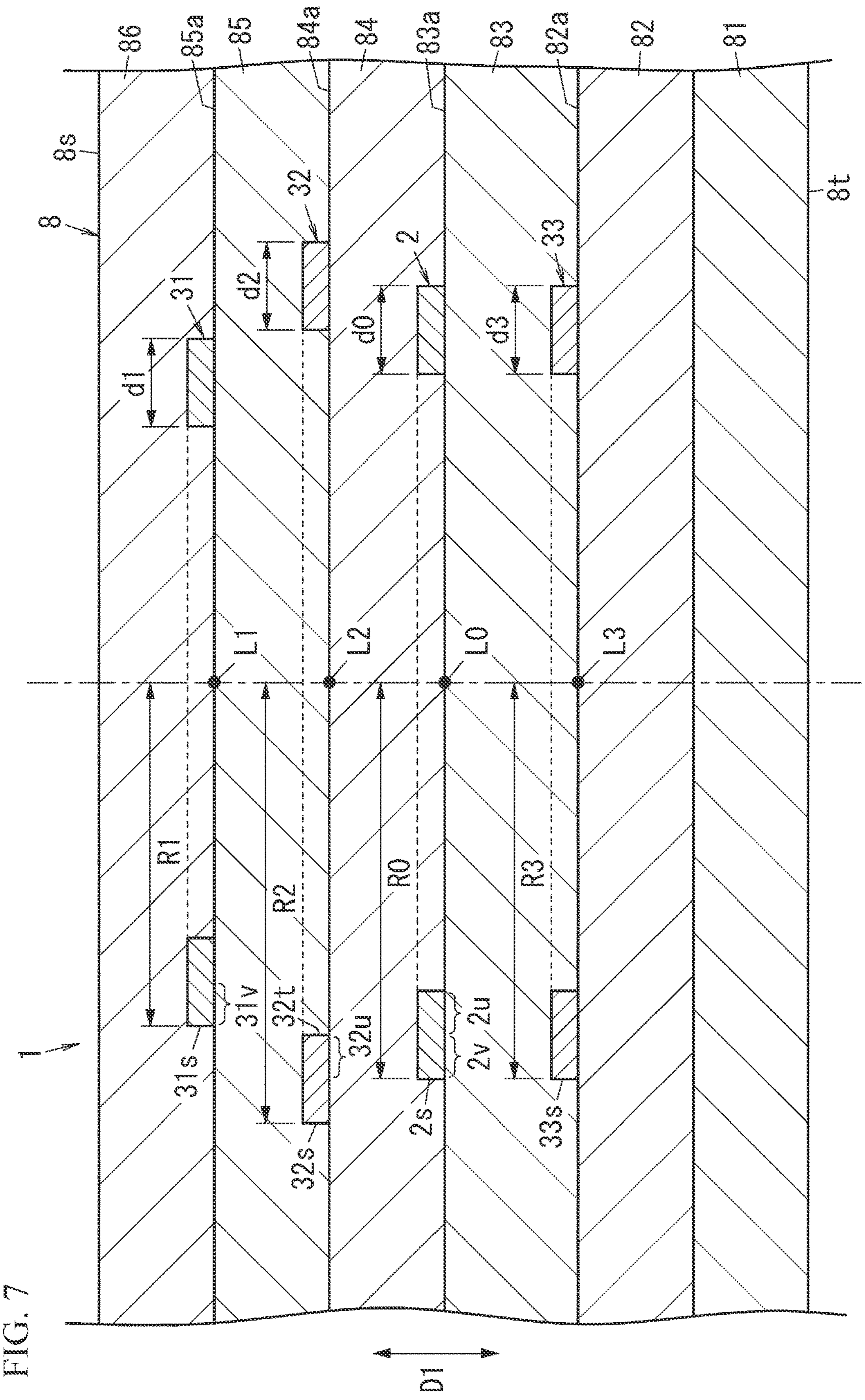
FIG. 7 is a sectional view of a multilayer substrate of the directional coupler.

As described above, the main line 2, the first sub line 31, the second sub line 32, and the third sub line 33 are respectively provided to the first principal surfaces of different dielectric layers among the plurality of dielectric layers 81 to 81 (see FIG. 7). In the example of FIG. 7, the first sub line 31 is provided to a first principal surface 85*a* of the dielectric layer 85. The second sub line 32 is provided to a first principal surface 84*a* of the dielectric layer 84. The main line 2 is provided to a first principal surface 83*a* of the dielectric layer 83. The third sub line 33 is provided to a first principal surface 82*a* of the dielectric layer 82.

Figure 8:
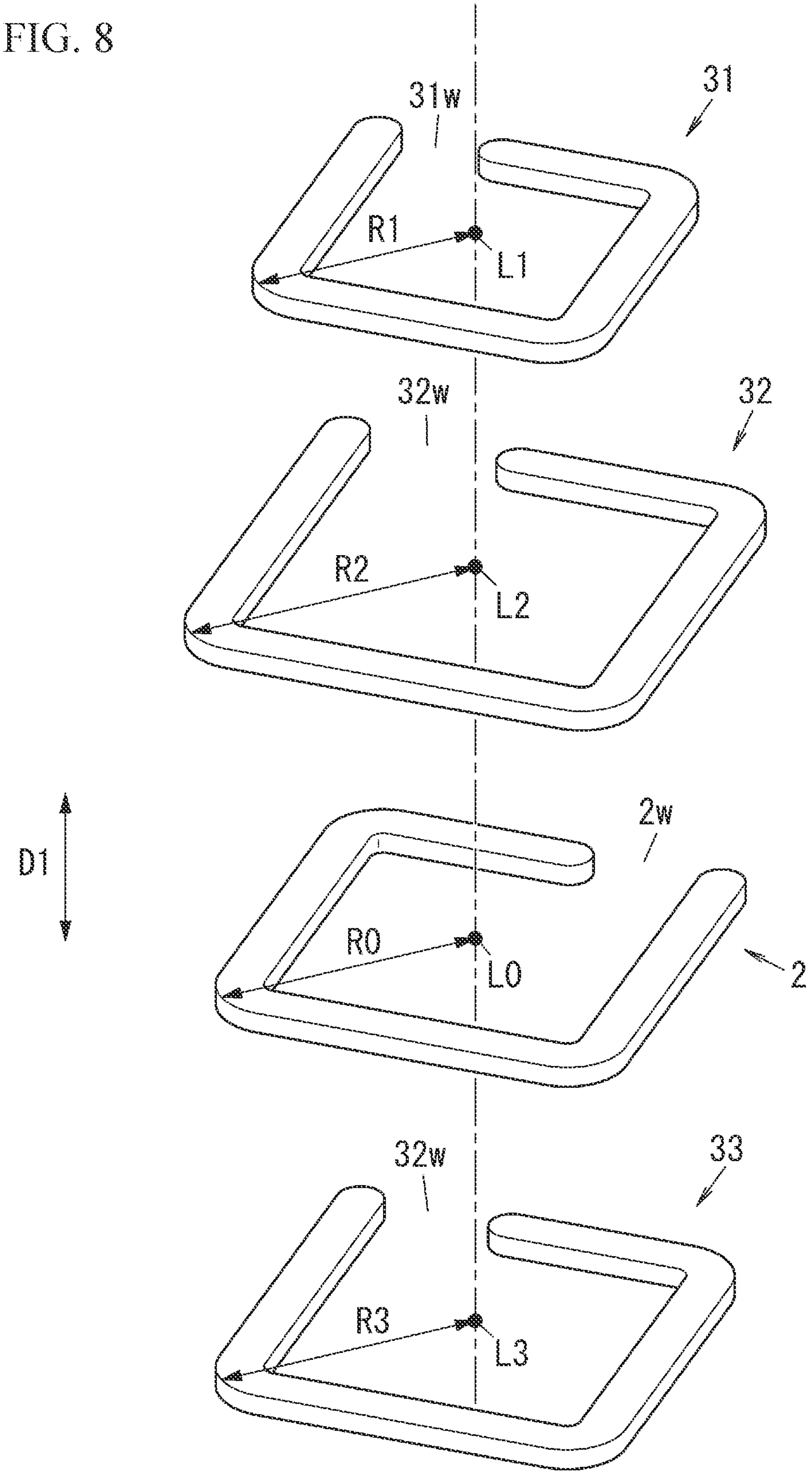
FIG. 8 is a perspective view illustrating a main line and first to third sub lines of the directional coupler.

Each of the main line 2, the first sub line 31, the second sub line 32, and the third sub line 33 is formed by, for example, a single band-shaped conductor, and is formed in a looped shape having a given shape (in the example of FIG. 8, in a square shape or a rectangular shape) in plan view from the thickness direction D1 (see FIG. 8). That is, each of the main line 2, the first sub line 31, the second sub line 32, and the third sub line 33 includes a line portion formed in the looped shape in plan view from the thickness direction D1 of the multilayer substrate 8. The line portions of the main line 2, the first sub line 31, the second sub line 32, and the third sub line 33 are respectively provided to different dielectric layers among the plurality of dielectric layers 81 to 86.

Here, the "looped shape" is an annular shape which is disconnected at a portion (a disconnected portion) in a circumferential direction. The main line 2, the first sub line 31, the second sub line 32, and the third sub line 33 respectively have disconnected portions 2*w*, 31*w*, 32*w*, and 33*w*. Although the "given shape" as described above is a square shape or a rectangular shape as an example, it may be a polygonal shape, a circular shape, and an oval shape. Although, in this embodiment, the main line 2, the first sub line 31, the second sub line 32, and the third sub line 33 have the given shape same as each other, the given shapes may be different from each other, or only one or some line(s) may have a different given shape.

The main line 2, the first sub line 31, the second sub line 32, and the third sub line 33 respectively have line widths d0, d1, d2, and d3. The line widths d0, d1, d2, and d3 are widths of the respective lines (the main line 2 and the first to third sub lines 31 to 33) in a direction orthogonal to their longitudinal direction in plan view from the thickness direction D1. Although, in this embodiment, the line widths d0, d1, d2, and d3 of the main line 2, the first sub line 31, the second sub line 32, and the third sub line 33 are the same as each other, they may be different from each other.

The main line 2, the first sub line 31, the second sub line 32, and the third sub line 33 respectively have first distances R0, R1, R2, and R3 different from each other (see FIGS. 7 and 8). Here, the "first distance" indicates distances between centers of gravity L0 to L3 to outer peripheries 2s and 31s to 33s of the lines (the main line 2 and the first to third sub lines 31 to 33), respectively, when seen from the thickness direction D1 (see FIG. 7). When the distance changes along the circumferential direction of each line, the "first distance" is the longest distance among the changing distances. In the example of FIGS. 7 and 8, among the three sub lines (the first sub line 31, the second sub line 32, and the third sub line 33), the first sub line 31 (the shortest sub line) has the first distance R1 which is the shortest. The second sub line 32 (the longest sub line) has the first distance R2 which is the longest. The third sub line 33 (the intermediate sub line) has the first distance R3 which is the first distance intermediate between the shortest first distance R1 and the longest first distance R2. The main line 2 has the first distance R0 which is the same as the first distance R3 of the third sub line 33. Note that the "centers of gravity L0 to L3" are centers of gravity of figures defined by closed outer peripheries of the lines (the main line 2 and the first to third sub lines 31 to 33) in plan view from the thickness direction D1, respectively. The closed outer peripheries are approximated by the outer peripheries 2s and 31s to 33s being closed.

That is, in the directional coupler 1, the first sub line 31 having the shortest first distance R1 and the second sub line 32 having the longest first distance R2 are disposed on the opposite side from the third sub line 33 having the intermediate first distance R3, with respect to the main line 2 in the thickness direction D1. In other words, the first sub line 31 having the shortest first distance R1 and the second sub line 32 having the longest first distance R2 are disposed on the first principal surface 8s side of the main line 2 in the thickness direction D1. On the other hand, the third sub line 33 having the intermediate first distance R3 is disposed on the second principal surface 8t side of the main line 2 with the first sub line 31 and the second sub line 32 in the main line 2.

As described above, in the thickness direction D1, the first sub line 31 having the shortest first distance R1 and the second sub line 32 having the longest first distance R2 are disposed on the opposite side from the third sub line 33 having the intermediate first distance R3 with respect to the main line 2. Therefore, the first sub line 31 and the second sub line 32 can be disposed having a gap from the third sub line 33. Thus, electromagnetic-field coupling between the third sub line 33 and the first and second sub lines 31 and 32 can be suppressed. Further, by the first sub line 31 having the shortest first distance R1 and the second sub line 32 having the longest first distance R2 being disposed on the same side of the main line 2 (that is, close to each other), a gap between the outer periphery 31s of the first sub line 31 and an inner periphery 32t of the second sub line 32 can easily be secured in plan view from the thickness direction D1. Therefore, electromagnetic-field coupling between the first sub line 31 and the second sub line 32 can be suppressed. From the above, it is possible to suppress the electromagnetic-field coupling between the first to third sub lines 31 to 33 while improving the electromagnetic-field coupling between the main line 2 and the first to third sub lines 31 to 33. As a result, directivity of the directional coupler 1 can be improved.

Note that, in this embodiment, the first sub line 31 is disposed on the first principal surface 8s side of the second sub line 32. However, the first sub line 31 may be disposed on the second principal surface 8t side of the second sub line 32. That is, the position of the first sub line 31 may be interchanged with the position of the second sub line 32. Further, in this embodiment, the first sub line 31 and the second sub line 32 are disposed on the first principal surface 8s side of the main line 2, and the third sub line 33 is disposed on the second principal surface 8t side of the main line 2. However, the first sub line 31 and the second sub line 32 may be disposed on the second principal surface 8t side of the main line 2, and the third sub line 33 may be disposed on the first principal surface 8s side of the main line 2. That is, the position of the first sub line 31 and the second sub line 32 may be interchanged with the position of the third sub line 33.

Figure 9:
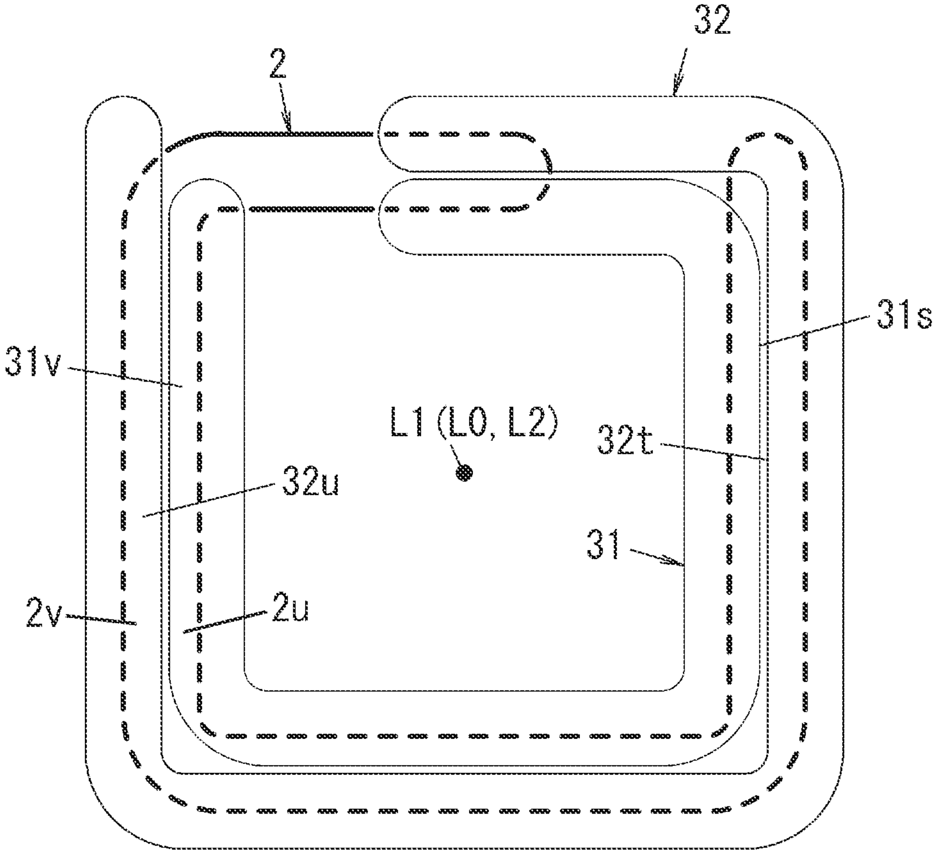
FIG. 9 is a plan view illustrating the main line, the first sub line, and the second sub line of the directional coupler.

As illustrated in FIGS. 7 and 9, the first sub line 31 has the outer periphery 31s and the second sub line 32 has the inner periphery 32t. In plan view from the thickness direction D1 of the multilayer substrate 8, the outer periphery 31s of the first sub line 31 is disposed on an inner side of the inner periphery 32t of the second sub line 32. In other words, the first sub line 31 having the shortest first distance R1 and the second sub line 32 having the longest first distance R2 are disposed so as not to overlap with each other in the line-width direction thereof in plan view from the thickness direction D1. Therefore, the two sub lines (the first sub line 31 and the second sub line 32) closest to each other among the three sub lines (the first to third sub lines 31 to 33) are disposed so as not to overlap with each other in the line-width direction thereof in plan view from the thickness direction D1. Thus, the electromagnetic-field coupling between the two sub lines closest to each other among the three sub lines can be suppressed.

Note that, in this embodiment, regarding the "inner side" and the "inner periphery", the inner side indicates a range on a side closer to the center of gravity in the line-width direction of each line and the inner periphery indicates a side (edge) of each line closer to the center of gravity when the line is seen from the center of gravity thereof. Further, regarding the "outer side" and the "outer periphery", the outer side indicates a range on a side farther from the center of gravity in the line-width direction of each line and the outer periphery indicates a side (edge) of each line farther from the center of gravity when the line is seen from the center of gravity thereof.

Further, as illustrated in FIGS. 7 and 9, the first sub line 31 includes an outer side portion 31v, the second sub line 32 includes an inner side portion 32u, and the main line 2 includes an outer side portion 2v and an inner side portion 2u. In plan view from the thickness direction D1 of the multilayer substrate 8, the main line 2 is disposed on the inner side of the outer periphery 32s of the second sub line 32. More specifically, in plan view from the thickness direction D1, the inner side portion 32u of the second sub line 32 is disposed to overlap with the outer side portion 2v of the main line 2. Therefore, the electromagnetic-field coupling between the second sub line 32 and the main line 2 can be improved. Further, in plan view from the thickness direction D1, the outer side portion 31v of the first sub line 31 is disposed to overlap with the inner side portion 2u of the main line 2. Therefore, the electromagnetic-field coupling between the first sub line 31 and the main line 2 can be improved.

Moreover, as illustrated in FIG. 7, the main line 2, the first sub line 31, the second sub line 32, and the third sub line 33 are concentrically disposed such that the centers of gravity L0, L1, L2, and L3 thereof overlap with each other in plan view from the thickness direction D1 of the multilayer substrate 8. Therefore, controlling the electromagnetic-field coupling of the main line 2, the first sub line 31, the second sub line 32, and the third sub line 33 becomes easier. Moreover, since the main line 2, the first sub line 31, the second sub line 32, and the third sub line 33 can be disposed together into one position, the directional coupler 1 can be downsized.

Note that the "centers of gravity of the respective lines overlap with each other in plan view from the thickness direction D1" includes a case where the centers of gravity of the lines are disposed within a circle having a given radius as well as the case where the centers of gravity of the lines overlap with each other at one point. Here, the given radius is, for example, a length at or below 10% of the longest first distance R2. That is, the case where the centers of gravity of the lines are disposed within the circle having the given radius is also deemed that the centers of gravity of the lines substantially overlap with each other.

Figure 10:
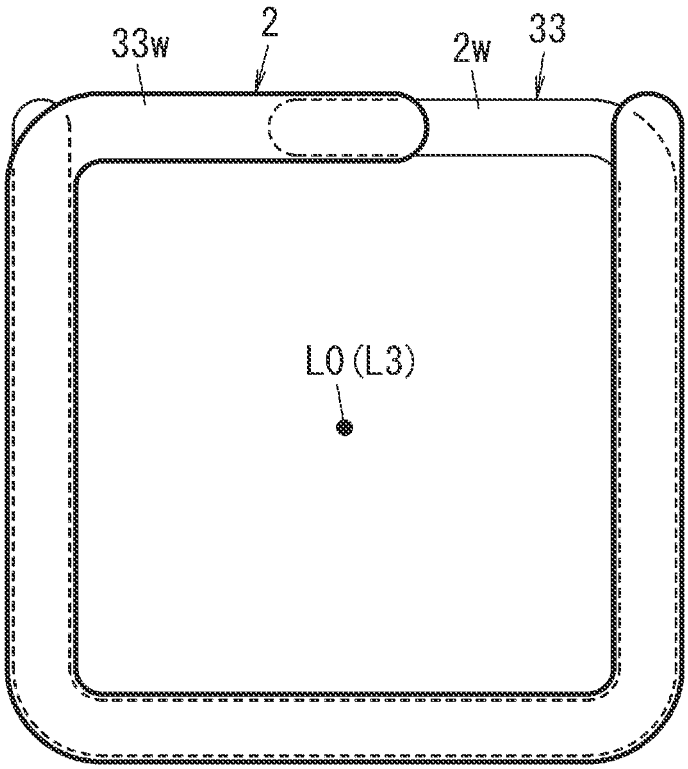
FIG. 10 is a plan view illustrating the main line and the third sub line of the directional coupler.

Further, as illustrated in FIG. 10, the main line 2 and the third sub line 33 are disposed so as to at least partially overlap with each other in a longitudinal direction thereof in plan view from the thickness direction D1 of the multilayer substrate 8. That is, the main line 2 and the third sub line 33 are disposed so as to at least partially aligned in parallel in plan view from the thickness direction D1. In the example of FIG. 10, the main line 2 and the third sub line 33 do not overlap with each other at the disconnected portions 2*w* and 33*w* in their circumferential direction (longitudinal direction), but overlap with each other at portions other than the disconnected portions 2*w* and 33*w*. That is, when the third sub line 33 is seen from the first sub line 31 and second sub line 32 side, the third sub line 33 is disposed to be hidden on the back of the main line 2. Therefore, the electromagnetic-field coupling between the third sub line 33 and the first and second sub lines 31 and 32 can be suppressed, and the directivity of the directional coupler 1 can be improved.

(5) Modifications

Modifications of Embodiment 1 are described below. Embodiment 1 and the modifications may be embodied while being combined. Note that, in the following description, description of components same as Embodiment 1 may be omitted by the same reference characters being assigned.

(5.1) Modification 1

Figure 11:
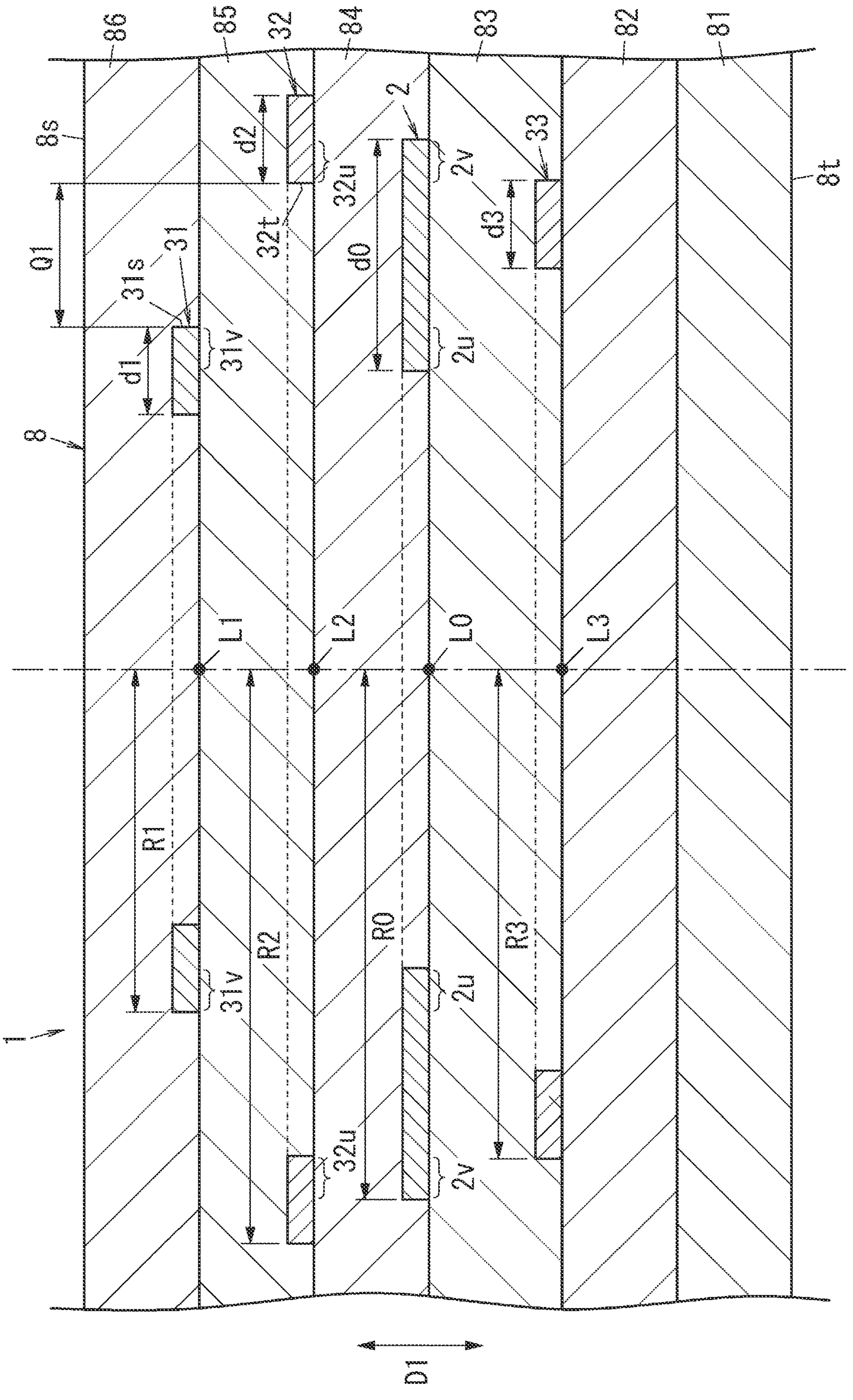
FIG. 11 is a sectional view illustrating a multilayer substrate of a directional coupler according to Modification 1.

Modification 1 is described with reference to FIG. 11. In Embodiment 1, the line width do of the main line 2 is the same as the line widths d1 to d3 of the first to third sub lines 31 to 33 (see FIG. 7). However, in this modification, the line width do of the main line 2 is larger than at least one of the line widths d1 to d3 of the first to third sub lines 31 to 33 (see FIG. 11). In the example of FIG. 11, the line width do of the main line 2 is larger than any of the line widths d1 to d3 of the first to third sub lines 31 to 33.

In this modification, similarly to Embodiment 1, the first sub line 31 and the second sub line 32 are formed such that the outer side portion 31*v* of the first sub line 31 overlaps with the inner side portion 2*u* of the main line 2 and the inner side portion 32*u* of the second sub line 32 overlaps with the outer side portion 2*v* of the main line 2 in plan view from the thickness direction D1. Like this modification, by the line width do of the main line 2 being larger than any one of the line widths d1 to d3 of the first to third sub lines 31 to 33, the first sub line 31 and the second sub line 32 can be formed such that a gap Q1 between the outer periphery 31*s* of the first sub line 31 and the inner periphery 32*t* of the second sub line 32 is increased in a state where the outer side portion 31*v* of a first main line 21 overlaps with the inner side portion 2*u* of the main line 2 and the inner side portion 32*u* of a second main line 22 overlaps with the outer side portion 2*v* of the main line 2 in plan view from the thickness direction D1 (see FIG. 11). Therefore, the electromagnetic-field coupling between the first sub line 31 and the second sub line 32 can further be suppressed.

(5.2) Modification 2

Modification 2 is described with reference to FIGS. 12 and 13. Although the main line 2 includes one line in Embodiment 1 (see FIG. 8), the main line 2 includes a plurality of (for example, two) lines (the first main line 21 and the second main line 22) which are electrically connected to each other in series in this modification (see FIG. 12).

Figure 12:
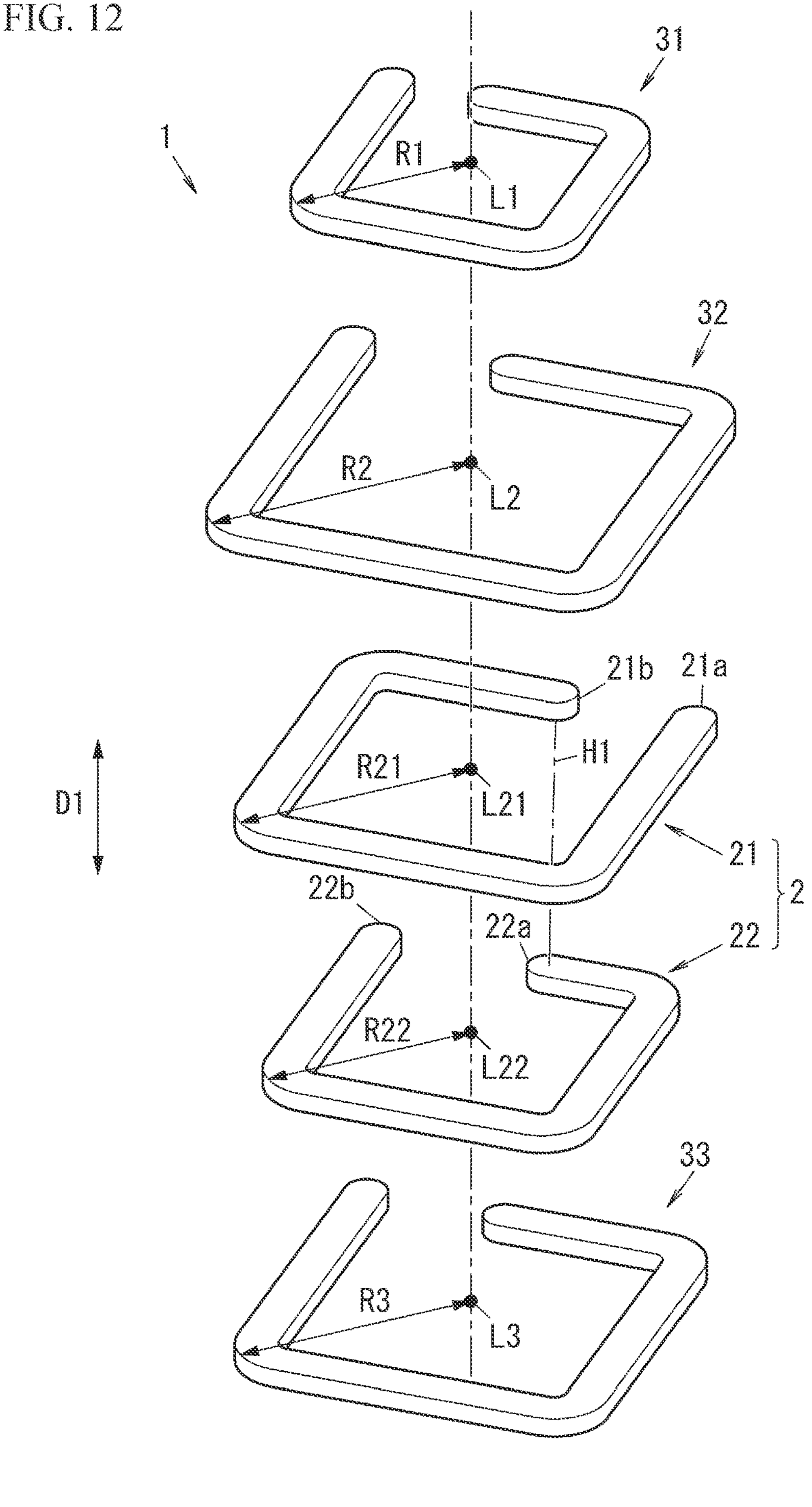
FIG. 12 is a perspective view illustrating a first main line, a second main line, and first to third sub lines of a directional coupler according to Modification 2.

More specifically, as illustrated in FIG. 12, the first main line 21 has a first end 21*a* and a second end 21*b*, and the second main line 22 has a first end 22*a* and a second end 22*b*. The second end 21*b* of the first main line 21 is electrically connected to the first end 22*a* of the second main line 22 through a wiring conductor H1, and thus the first main line 21 and the second main line 22 are electrically connected to each other in series. The first end 21*a* of the first main line 21 is connected to the output port, and the second end 22*b* of the second main line 22 is connected to the input port.

Each of the first main line 21 and the second main line 22 is formed in a looped shape having a given shape (in the example of FIG. 12, in a square shape or a rectangular shape) in plan view from the thickness direction D1. That is, each of the first main line 21 and the second main line 22 includes a line portion formed in the looped shape in plan view from the thickness direction D1. The first main line 21, the second main line 22, the first sub line 31, the second sub line 32, and the third sub line 33 are concentrically disposed such that their centers of gravity overlap with each other in plan view from the thickness direction D1.

In each of the first main line 21 and the second main line 22, the longest distance among distances between an outer periphery 21*s* or 22*s* and a center of gravity L21 or L22 is the first distance. The first main line 21 and the second main line 22 respectively have first distances R21 and R22 which are different from each other. In this modification, the first distance R21 is longer than the first distance R22 (see FIGS. 12 and 13). Note that the first distances R21 and R22 of the first main line 21 and the second main line 22 may be the same. Further, the first distance R21 of the first main line 21 is shorter than the first distance R2 of the second sub line 32 (that is, the longest first distance). The first distance R22 of the second main line 22 is longer than the first distance R1 of the first sub line 31 (that is, the shortest first distance).

Figure 13:
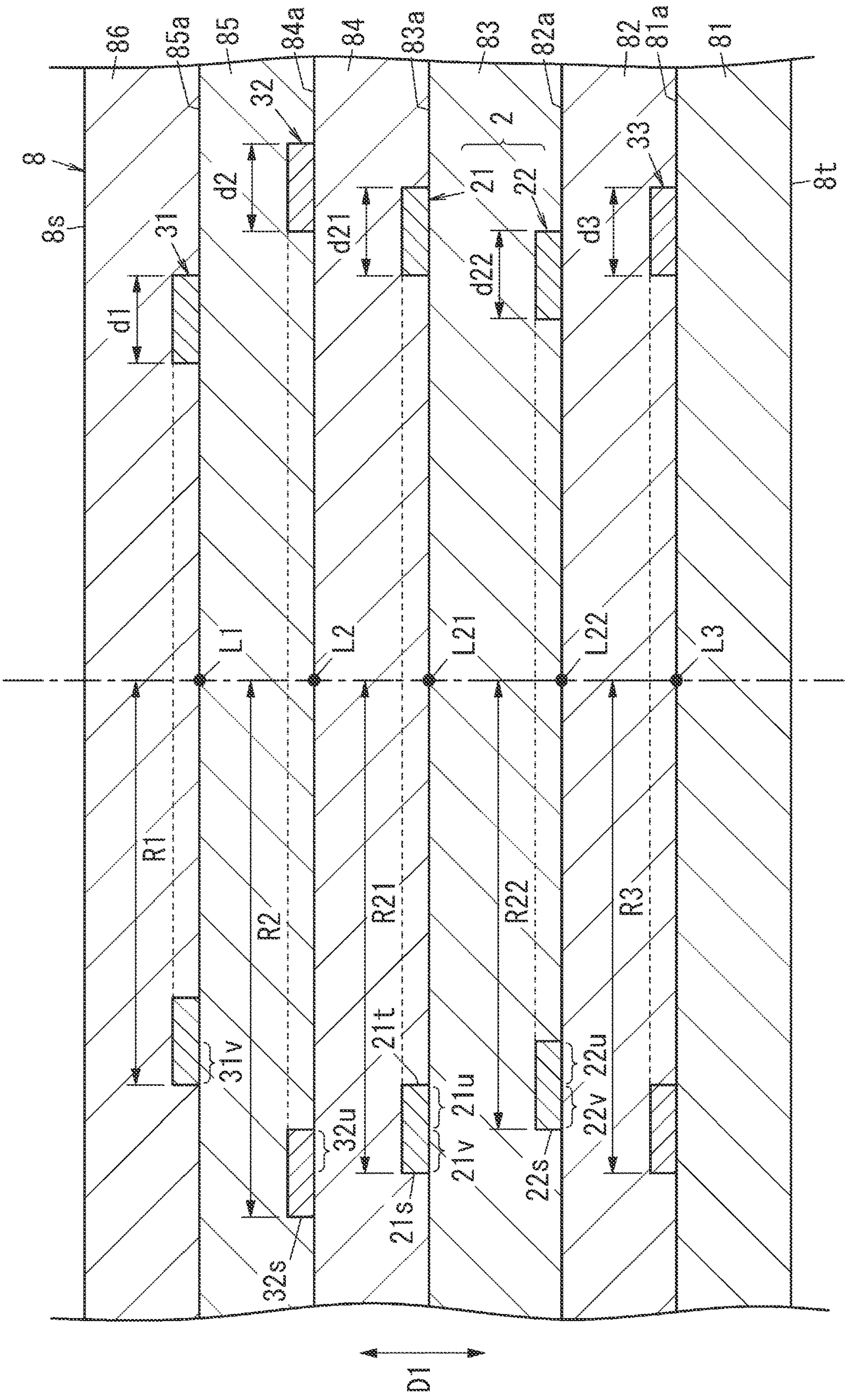
FIG. 13 is a sectional view of a multilayer substrate of the directional coupler.

As illustrated in FIG. 13, the first main line 21 and the second main line 22 are respectively provided to different dielectric layers among the plurality of dielectric layers 81 to 86. That is, the line portions of the first main line 21 and the second main line 2 are respectively provided to different dielectric layers among the plurality of dielectric layers 81 to 86. In the example of FIG. 13, the first main line 21 and the second main line 22 are respectively provided to the first principal surfaces 83*a* and 82*a* of the dielectric layers 83 and 82. That is, the first main line 21 with the longer first distance is disposed on the first principal surface 8*s* side of the second main line 22 with the shorter first distance. Note that the first sub line 31, the second sub line 32, and the third sub line 33 are respectively provided to first principal surfaces 85*a*, 84*a*, and 81*a* of the dielectric layers 85, 84, and 81.

Further, line widths d21 and d22 of the first main line 21 and the second main line 22 are the same as each other. Moreover, the line widths d21 and d22 of the first main line 21 and the second main line 22 are the same as the line widths d1 to d3 of the first to third sub lines 31 to 33. However, the line widths d21 and d22 of the first main line 21 and the second main line 22 may be different from each other, and/or they may be different from the line widths d1 to d3 of the first to third sub lines 31 to 33.

Further, the second main line 22 is disposed on the inner side of the outer periphery 21*s* of the first main line 21 in plan view from thickness direction D1. In this modification, although an inner side portion 21*u* of the first main line 21 overlaps with an outer peripheral portion 22*v* of the second main line 22 in plan view from the thickness direction D1, it is also possible that the inner side portion 21*u* of the first main line 21 does not overlap with the second main line 22 at all. That is, in plan view from the thickness direction D1, the second main line 22 may be disposed on the inner side of an inner periphery 21*t* of the first main line 21.

Further, the first sub line 31 and the second sub line 32 are disposed on the first principal surface 8*s* side of the first main line 21. The first sub line 31 is disposed on the first principal surface 8*s* side of the second sub line 32. The third sub line 33 is disposed on the second principal surface 8*t* side of the second main line 22.

Further, the inner side portion 32*u* of the second sub line 32 overlaps with an outer side portion 21*v* of the first main line 21 in plan view from the thickness direction D1. Moreover, the outer side portion 31*v* of the first sub line 31 overlaps with an inner side portion 22*u* of the second main line 22.

The third sub line 33 is disposed to at least partially overlap with at least one of the first main line 21 and the second main line 22 in the thickness direction D1. For example, the first distance R3 of the third sub line 33 is the same as the first distance R21 of the first main line 21. Therefore, the third sub line 33 is disposed to be hidden on the back of the first main line 21 in plan view from the thickness direction D1. However, the third sub line 33 may be disposed to be hidden on the back of the second main line 22 in plan view from the thickness direction D1, by the first distance R3 of the third sub line 33 being the same as the first distance R22 of the second main line 22.

According to this modification, the main line 2 can be configured as a two-layer structure (the first main line 21 and the second main line 22), and thus, impedance of the main line 2 can easily be controlled. Further, the first distances R21 and R22 of the first main line 21 and the second main line 22 can be controlled separately, and also by this, the impedance of the main line 2 can easily be controlled.

(5.3) Modification 3

In Embodiment 1, the case is assumed where the directional coupler 1 detects the high-frequency signal which is inputted from the input port 41 and outputted from the output port 42. However, a high-frequency signal inputted from the output port 42 and outputted from the input port 41 may be detected. In this case, in FIG. 1, the layout of the entire configuration (the first to third sub lines 31 to 33, the first to third coupling ports 43 to 45, the first switches 5 and 6, and the termination circuit 7) except for the main line 2, the input port 41, and the output port 42 are mirror-reversed so that the first sub line 31 is disposed on the input port 41 side, and the third sub line 33 and the third coupling port 45 are disposed on the output port 42 side.

Embodiment 2

A high-frequency module 100 and a communication device 200 according to Embodiment 2 are described with reference to FIG. 14. The high-frequency module 100 according to Embodiment 2 is one example of a high-frequency module provided with the directional coupler 1 of Embodiment 1. The communication device 200 according to Embodiment 2 is one example of the communication device 200 provided with the high-frequency module 100.

(1) Configuration of Communication Device

The communication device 200 is, for example, a mobile terminal (for example, a smartphone) or a wearable terminal (for example, a smartwatch). The communication device 200 is provided with the high-frequency module 100, a signal processing circuit 210, and an antenna 220.

The high-frequency module 100 extracts a reception signal in a given frequency band from reception signals received by the antenna 220, and amplifies the extracted signal and outputs it to the signal processing circuit 210. Further, the high-frequency module 100 amplifies a transmission signal outputted from the signal processing circuit 210 to convert it into a transmission signal in a given frequency band, and outputs it from the antenna 220.

The signal processing circuit 210 is connected to the high-frequency module 100 and executes signal processing to the high-frequency signal. More specifically, the signal processing circuit 210 executes signal processing to the reception signal outputted from the high-frequency module 100, and executes signal processing to the transmission signal to be outputted to the high-frequency module 100. The signal processing circuit 210 includes an RF signal processing circuit 211 and a baseband signal processing circuit 212.

The RF signal processing circuit 211 is, for example, a radio frequency integrated circuit (RFIC). The RF signal processing circuit 211 executes signal processing (for example, down conversion) to the reception signal outputted from the high-frequency module 100, and outputs the processed signal to the baseband signal processing circuit 212. Further, the RF signal processing circuit 211 executes signal processing (for example, up conversion) to the transmission signal outputted from the baseband signal processing circuit 212, and outputs the processed signal to the high-frequency module 100. The baseband signal processing circuit 212 is, for example, a baseband integrated circuit (BBIC). The baseband signal processing circuit 212 outputs the reception signal outputted from the RF signal processing circuit 211 to outside. Further, the baseband signal processing circuit 212 generates a transmission signal based on a baseband signal (for example, an audio signal and an image signal) inputted from outside, and outputs the generated transmission signal to the RF signal processing circuit 211.

(2) Configuration of High-Frequency Module

The high-frequency module 100 is provided with, as circuit components, a plurality of outer connection terminals 110, power amplifiers 151 and 152, low noise amplifiers 161 and 162, transmission filters 61T to 64T, reception filters 61R to 64R, output matching circuits 131 and 132, matching circuits 141 and 142, matching circuits 71 to 74, switches 51 to 55, a diplexer 60, and the directional coupler 1 (coupler).

The plurality of outer connection terminals 110 include an antenna terminal 130, two signal inputting terminals 111 and 112, two signal outputting terminals 121 and 122, and three coupler output terminals (first to third coupler output terminals 181 to 183). The antenna terminal 130 is a terminal to which the antenna 220 is connected. The two signal inputting terminals 111 and 112 are terminals into which the transmission signal from the signal processing circuit 210 is inputted and which are connected to an output module of the signal processing circuit 210. The two signal outputting terminals 121 and 122 are terminals which output the transmission signal from the high-frequency module 100 to the signal processing circuit 210 and are connected to an input module of the signal processing circuit 210. The three coupler output terminals (the first to third coupler output terminals 181 to 183) are terminals which output the detection signal extracted by the directional coupler 1 to outside (for example, to the signal processing circuit 210).

The power amplifiers 151 and 152 each includes an input module and an output module. The input modules of the power amplifiers 151 and 152 are respectively connected to the signal inputting terminals 111 and 112, and the output modules of the power amplifiers 151 and 152 are respectively connected to common terminals of the switches 51 and 52 with the output matching circuits 131 and 132 interposed therebetween. The power amplifiers 151 and 152 respectively amplify the transmission signals inputted from the signal inputting terminals 111 and 112, and output the amplified transmission signals to the common terminals of the switches 51 and 52 with the output matching circuits 131 and 132 interposed therebetween.

The switch 51 includes the common terminal and two selection terminals (a first selection terminal and a second selection terminal). The common terminal of the switch 51 is connected to the power amplifier 151 with the output matching circuit 131 interposed therebetween. The two selection terminals of the switch 51 are respectively connected to input modules of the transmission filters 61T and 62T. The switch 51 selectively outputs an output signal of the power amplifier 151 to one of the transmission filters 61T and 62T. The switch 52 includes the common terminal and two selection terminals (a first selection terminal and a second selection terminal). The common terminal of the switch 52 is connected to the power amplifier 152 with the output matching circuit 132 interposed therebetween. The two selection terminals of the switch 52 are respectively connected to input modules of the transmission filters 63T and 64T. The switch 52 selectively outputs an output signal of the power amplifier 152 to one of the transmission filters 63T and 64T.

The transmission filter 61T includes the input module and an output module. The input module of the transmission filter 61T is connected to the first selection terminal of the switch 51, and the output module of the transmission filter 61T is connected to the switch 55 with the matching circuit 71 interposed therebetween. The transmission filter 61T allows a transmission signal in a transmission band of a first communication band to pass, among the transmission signals amplified by the power amplifier 151. The transmission filter 62T includes the input module and an output module. The input module of the transmission filter 62T is connected to the second selection terminal of the switch 51, and the output module of the transmission filter 62T is connected to the switch 55 with the matching circuit 72 interposed therebetween. The transmission filter 62T allows a transmission signal in a transmission band of a second communication band to pass, among the transmission signals amplified by the power amplifier 151. The transmission filter 63T includes the input module and an output module. The input module of the transmission filter 63T is connected to the first selection terminal of the switch 52, and the output module of the transmission filter 63T is connected to the switch 55 with the matching circuit 73 interposed therebetween. The transmission filter 63T allows a transmission signal in a transmission band of a third communication band to pass, among the transmission signals amplified by the power amplifier 152. The transmission filter 64T includes the input module and an output module. The input module of the transmission filter 64T is connected to the second selection terminal of the switch 52, and the output module of the transmission filter 64T is connected to the switch 55 with the matching circuit 74 interposed therebetween. The transmission filter 64T allows a transmission signal in a transmission band of a fourth communication band to pass, among the transmission signals amplified by the power amplifier 152.

The low noise amplifiers 161 and 162 each includes an input module and an output module. The input modules of the low noise amplifiers 161 and 162 are respectively connected to common terminals of the switches 53 and 54 with the matching circuits 141 and 142 interposed therebetween. The output modules of the low noise amplifiers 161 and 162 are respectively connected to the signal outputting terminals 121 and 122. The low noise amplifiers 161 and 162 respectively amplify reception signals outputted from the switches 53 and 54 and output the amplified reception signals to the signal outputting terminals 121 and 122.

The switch 53 includes the common terminal and two selection terminals (a first selection terminal and a second selection terminal). The common terminal of the switch 53 is connected to the low noise amplifier 161 with the matching circuit 141 interposed therebetween. The two selection terminals of the switch 53 are respectively connected to output modules of the reception filters 61R and 62R. The switch 53 selectively outputs a reception signal from one of the reception filters 61R and 62R to the low noise amplifier 161. The switch 54 includes the common terminal and two selection terminals (a first selection terminal and a second selection terminal). The common terminal of the switch 54 is connected to the low noise amplifier 162 with the matching circuit 142 interposed therebetween. The two selection terminals of the switch 54 are respectively connected to output modules of the reception filters 63R and 63R. The switch 54 selectively outputs a reception signal from one of the reception filters 63R and 64R to the low noise amplifier 162.

The reception filter 61R includes an input module and the output module. The input module of the reception filter 61R is connected to a selection terminal of the switch 55 with the matching circuit 71 interposed therebetween, and the output module of the reception filter 61R is connected to the first selection terminal of the switch 53. The reception filter 61R allows a reception signal in a reception band of the first communication band to pass, among the transmission signal outputted from the switch 55. The reception filter 62R includes an input module and the output module. The input module of the reception filter 62R is connected to a selection terminal of the switch 55 with the matching circuit 72 interposed therebetween, and the output module of the reception filter 62R is connected to the second selection terminal of the switch 53. The reception filter 62R allows a reception signal in a reception band of the second communication band to pass, among the transmission signal outputted from the switch 55. The reception filter 63R includes an input module and the output module. The input module of the reception filter 63R is connected to a selection terminal of the switch 55 with the matching circuit 73 interposed therebetween, and the output module of the reception filter 63R is connected to the first selection terminal of the switch 54. The reception filter 63R allows a reception signal in a reception band of the third communication band to pass, among the reception signal outputted from the switch 55. The reception filter 64R includes an input module and the output module. The input module of the reception filter 64R is connected to a selection terminal of the switch 55 with the matching circuit 74 interposed therebetween, and the output module of the reception filter 64R is connected to the second selection terminal of the switch 54. The reception filter 64R allows a reception signal in a reception band of the fourth communication band to pass, among the reception signal outputted from the switch 55.

The output matching circuit 131 is connected between the output module of the power amplifier 151 and the common terminal of the switch 51 and ensures impedance matching between the power amplifier 151 and the transmission filters 61T and 62T. The output matching circuit 132 is connected between the output module of the power amplifier 152 and the common terminal of the switch 52 and ensures impedance matching between the power amplifier 152 and the transmission filters 63T and 64T. The matching circuit 141 is connected between the input module of the low noise amplifier 161 and the common terminal of the switch 53 and ensures impedance matching between the low noise amplifier 161 and the reception filters 61R and 61R. The matching circuit 142 is connected between the input module of the low noise amplifier 162 and the common terminal of the switch 54 and ensures impedance matching between the low noise amplifier 162 and the reception filters 63R and 64R.

The matching circuit 71 is connected between a selection terminal 55*b* (described later) of the switch 55 and the output module of the transmission filter 61T and between the selection terminal 55*b* and the input module of the reception filter 61R, and ensures impedance matching between the switch 55 and the transmission filter 61T and between the switch 55 and the reception filter 61R. The matching circuit 72 is connected between a selection terminal 55*c* (described later) of the switch 55 and the output module of the transmission filter 62T and between the selection terminal 55*c* and the input module of the reception filter 62R, and ensures impedance matching between the switch 55 and the transmission filter 62T and between the switch 55 and the reception filter 62R. The matching circuit 73 is connected between a selection terminal 55*d* (described later) of the switch 55 and the output module of the transmission filter 63T and between the selection terminal 55*d* and the input module of the reception filter 63R, and ensures impedance matching between the switch 55 and the transmission filter 63T and between the switch 55 and the reception filter 63R. The matching circuit 74 is connected between a selection terminal 55*e* (described later) of the switch 55 and the output module of the transmission filter 64T and between the selection terminal 55*e* and the input module of the reception filter 64R, and ensures impedance matching between the switch 55 and the transmission filter 64T and between the switch 55 and the reception filter 64R.

The diplexer 60 includes a first filter 60L and a second filter 60H. The first filter 60L is a filter having a pass band in a frequency range including the first to fourth frequency bands described above. The second filter 60H is a filter having a pass band in a frequency range including a frequency band different from the first to fourth frequency bands described above. The first filter 60L and the second filter 60H each includes two input-and-output modules (a first input-and-output module and a second input-and-output module). The first input-and-output module of each of the first filter 60L and the second filter 60H is connected to the antenna terminal 130 with the directional coupler 1 interposed therebetween. The second input-and-output module of the first filter 60L is connected to a common terminal of the switch 55. The first input-and-output module of the first filter 60L and the first input-and-output module of the second filter 60H may altogether be referred to below as a "first input-and-output module of the diplexer 60".

The directional coupler 1 is configured similarly to the directional coupler 1 of Embodiment 1. The directional coupler 1 extracts, as a detection signal, a part of high-frequency signals (reception signals) flowing in a partial section (the main line 2) of the signal path between the antenna terminal 130 and the first input-and-output module of the diplexer 60, from the sub line 3 which is electromagnetic-field coupled with the main line 2. Then, the directional coupler 1 outputs the extracted detection signal to outside of the high-frequency module 100 (for example, to the signal processing circuit 210) with one of the first to third coupler output terminals 181 to 183 interposed therebetween.

Similarly to the directional coupler 1 of Embodiment 1, the directional coupler 1 of this embodiment is provided with the main line 2, the first to third sub lines 31 to 33, the two first switches 5 and 6, and the termination circuit 7.

In the directional coupler 1 of this embodiment, the first switches 5 and 6 are included in the switch 55 and is configured integrally with the switch 55.

In this embodiment, the first end of the main line 2 is connected to the antenna terminal 130, and the second end of the main line 2 is connected to the first input-and-output module of the diplexer 60. That is, the main line 2 of the directional coupler 1 constitutes the partial section of the signal path between the antenna terminal 130 and the diplexer 60. The first end of the first sub line 31 is connected to the ground with the termination circuit 7 interposed therebetween, and the second end of the first sub line 31 is connected to the common terminal 5*a* (described later) of the switch 55. The first end of the second sub line 32 is connected to the selection terminal 5*b* (described later) of the switch 55, and the second end of the second sub line 32 is connected to the common terminal 6*a* (described later) of the switch 55. The first end of the third sub line 33 is connected to the selection terminal 6*b* (described later) of the switch 55, and the second end of the third sub line 33 is connected to the third coupler output terminal 183.

The switch 55 is an antenna switch. The switch 55 is referred to below as a second switch 55. The second switch 55 is a switch which switches connection and disconnection between a signal path S0 leading to the antenna terminal 130 and a plurality of signal paths S1 to S4 respectively leading to a plurality of duplexers 61 to 64 (filters). The second switch 55 includes the first switches 5 and 6 as described above.

More specifically, the second switch 55 includes a common terminal 55*a*, a plurality of selection terminals 55*b*, 55*c*, 55*d*, and 55*e*, the common terminal 5*a* and the two selection terminals 5*b* and 5*c* of the switch 5, and the common terminal 6*a* and the two selection terminals 6*b* and 6*c* of the first switch 6.

The common terminal 55*a* of the second switch 55 is connected to the second input-and-output module of the first filter 60L. The plurality of selection terminals 55*b*, 55*c*, 55*d*, and 55*e* of the second switch 55 are respectively connected to first input-and-output modules of the duplexers 61 to 64 with the matching circuits 71 to 74 interposed therebetween. The selection terminals 5*c* and 6*c* of the second switch 55 are respectively connected to the first coupler output terminal 181 and the second coupler output terminal 182. The common terminals 5*a* and 6*a* of the second switch 55 are respectively connected to the second end of the first sub line 31 and the second end of the second sub line 32 of the directional coupler 1. The selection terminals 5*b* and 6*b* of the second switch 55 are respectively connected to the first end of the second sub line 32 and the first end of the third sub line 33 of the directional coupler 1.

Figure 14:
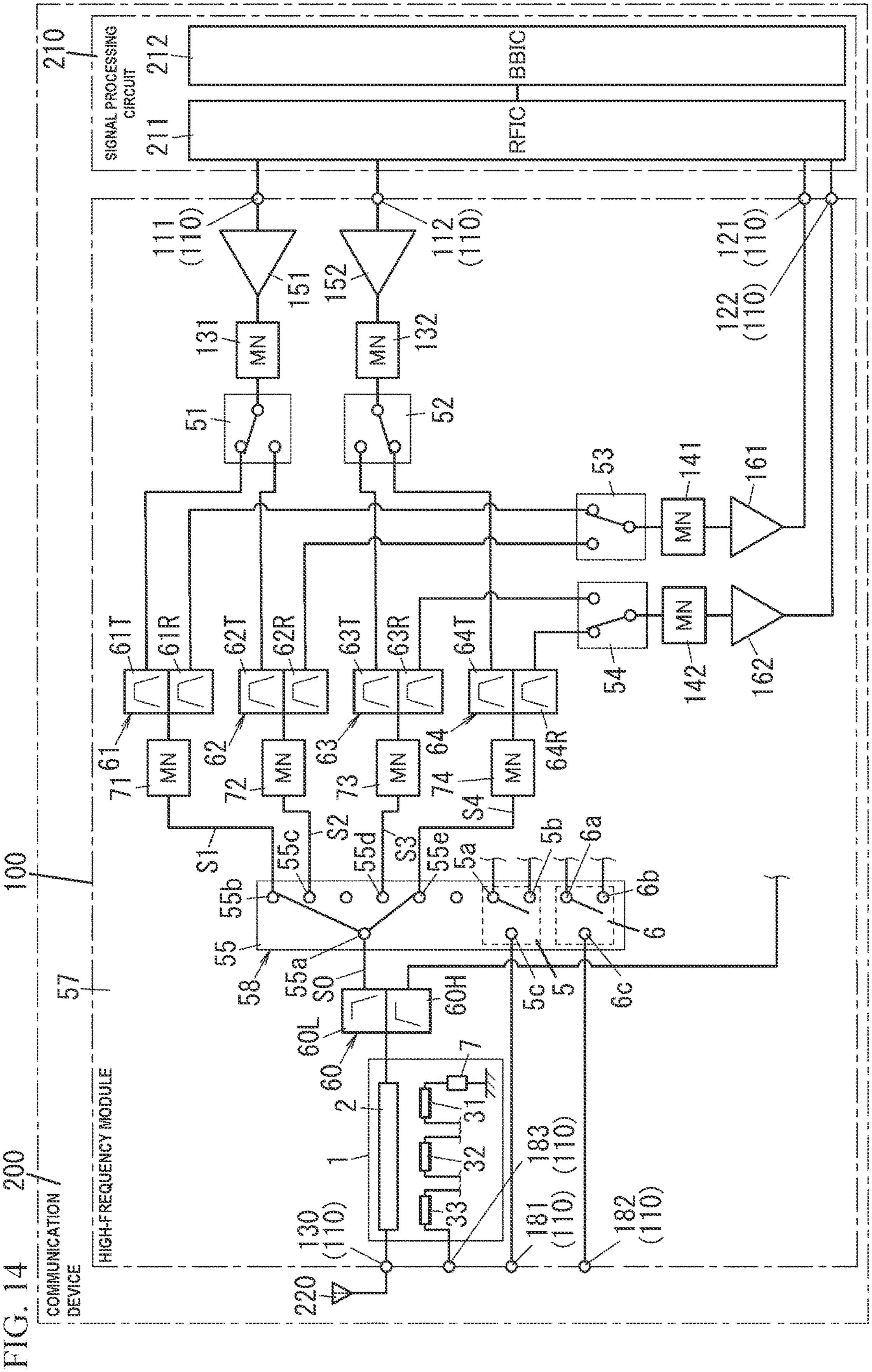
FIG. 14 is a configuration diagram illustrating one example of a communication device according to Embodiment 2.

The high-frequency module 100 of this embodiment further includes a multilayer substrate 57 and an IC chip 58 (see FIG. 14). The multilayer substrate 57 is a circuit board where the above-described circuit components provided to the high-frequency module 100 are disposed. The multilayer substrate 57 is configured similarly to the multilayer substrate 8 of Embodiment 1 and includes a plurality of dielectric layers. The multilayer substrate 57 has a first principal surface and a second principal surface opposed to each other in its thickness direction. Among the circuit components described above, the circuit components other than the lines (the main line 2 and the first to third sub lines 31 to 33) of the directional coupler 1 are provided to one of the first principal surface and the second principal surface of the multilayer substrate 57. The lines (the main line 2 and the first to third sub lines 31 to 33) of the directional coupler 1 are respectively provided to different dielectric layers among the plurality of dielectric layers of the multilayer substrate 57, similarly to the case of Embodiment 1.

The IC chip 58 includes the first switches 5 and 6 of the directional coupler 1 and the second switch 55. That is, the first switches 5 and 6 and the second switch 55 are integrally configured as the IC chip 58.

The IC chip 58 is provided to one of the first principal surface and the second principal surface of the multilayer substrate 57. Also in this embodiment, similarly to Embodiment 1, each of the lines (the main line 2 and the first to third sub lines 31 to 33) of the directional coupler 1 may at least partially overlap with the IC chip 58 in plan view from the thickness direction of the multilayer substrate 57.

According to this embodiment, the IC chip 58 includes the first switches 5 and 6 and the second switch 55. Therefore, the first switches 5 and 6 and the second switch 55 can be disposed together into one position, and thus, the high-frequency module 100 can be downsized.

Embodiment 2 may be embodied by being combined with Embodiment 1 and the modifications thereof.

(Modes)

Following modes based on the above-described embodiments and modifications are disclosed.

The directional coupler (1) according to a first mode includes the main line (2), the first sub line (31), the second sub line (32), the third sub line (33), and the multilayer substrate (8). The multilayer substrate (8) includes the plurality of dielectric layers (81 to 86). The multilayer substrate (8) has the first principal surface (8*s*) and the second principal surface (8*t*) opposed to each other. The first sub line (31) and the second sub line (32) are connected to each other in series. The second sub line (32) and the third sub line (33) are connected to each other in series. Each of the main line (2), the first sub line (31), the second sub line (32), and the third sub line (33) includes the line portion formed in a looped shape in plan view from the thickness direction (D1) of the multilayer substrate (8). The line portions of the main line (2), the first sub line (31), the second sub line (32), and the third sub line (33) are respectively provided to different dielectric layers among the plurality of dielectric layers (81 to 86). In each of the first sub line (31), the second sub line (32), and the third sub line (33), the longest distance among the distances from the outer periphery (2*s* and 31*s* to 33*s*) to the center of gravity thereof (L0 to L3) is the first distance (R0, R1, R2, and R3). The first sub line (31), the second sub line (32), and the third sub line (33) respectively have the first distances (R1 to R3) different from each other, the first distances (R1 to R3) being the longest distance, the intermediate distance, and the shortest distance. Among the first sub line (31), the second sub line (32), and the third sub line (33), the longest sub line (32) having the longest first distance (R2) and the shortest sub line (31) having the shortest first distance (R1) are disposed on the first principal surface (8*s*) side of the main line (2), and the intermediate sub line (33) having the intermediate first distance (R3) is disposed on the second principal surface (8*t*) side of the main line (2).

According to this configuration, the longest sub line (32) and the shortest sub line (31) are disposed on the opposite side from the intermediate sub line (33) with respect to the main line (2). Therefore, the longest sub line (32) and the shortest sub line (31) can be disposed having a gap from the intermediate sub line (33). Thus, electromagnetic-field coupling between the intermediate sub line (33) and the longest and shortest sub lines (32 and 31) can be suppressed. Further, the longest sub line (32) and the shortest sub line (31) are disposed on the same side of the main line (2). Therefore, a gap between the two sub lines (the longest sub line (32) and the shortest sub line (31)) closest to each other among the three sub lines (31 to 33) can easily be secured. Thus, electromagnetic-field coupling between the two sub lines (the longest sub line (32) and the shortest sub line (31)) closest to each other among the three sub lines (31 to 33) can be suppressed. As described above, while electromagnetic-field coupling between the main line (2) and the first to third sub lines (31 to 33) is improved, electromagnetic-field coupling between the first to third sub lines (33) can be suppressed. As a result, directivity of the directional coupler (1) can be improved.

In the directional coupler (1) according to a second mode, in the first mode, the longest sub line (32) and the shortest sub line (31) are disposed so as not to overlap with each other in the line-width direction thereof in plan view from the thickness direction (D1) of the multilayer substrate (8).

According to this configuration, the two sub lines (the longest sub line (32) and the shortest sub line (31)) closest to each other in the thickness direction (D1) among the three sub lines (31 to 33) are disposed so as not to overlap with each other in plan view from the thickness direction (D1). Therefore, electromagnetic-field coupling between these two sub lines can be suppressed.

In the directional coupler (1) according to a third mode, in the first or second mode, the main line (2) and the intermediate sub line (33) are disposed so as to at least partially overlap with each other in the longitudinal direction thereof in plan view from the thickness direction (D1) of the multilayer substrate (8).

According to this configuration, when seen from the longest sub line (32) and the shortest sub line (31), the intermediate sub line (33) can be disposed to be hidden on the back of the main line (2). Therefore, electromagnetic-field coupling between the intermediate sub line (33) and the longest and shortest sub lines (32 and 31) can be suppressed.

In the directional coupler (1) according to a fourth mode, in any one of the first to third modes, in plan view from the thickness direction (D1) of the multilayer substrate (8), the inner side portion (32*u*) of the longest sub line (32) overlaps with the outer side portion (2*v*) of the main line (2), and the outer side portion (31*v*) of the shortest sub line (31) overlaps with the inner side portion (2*u*) of the main line (2).

According to this configuration, electromagnetic-field coupling between the longest sub line (32) and the main line (2) can be improved. Further, electromagnetic-field coupling between the shortest sub line (31) and the main line (2) can be improved.

In the directional coupler (1) according to a fifth mode, in any one of the first to fourth modes, the main line (2), the first sub line (31), the second sub line (32), and the third sub line (33) are concentrically disposed in plan view from the thickness direction (D1) of the multilayer substrate (8).

According to this configuration, electromagnetic-field coupling between the main line (2) and the first to third sub lines (31 to 33) can easily be controlled. Further, the main line (2) and the first to third sub lines (31 to 33) can be disposed together into one position, and thus, the directional coupler (1) can be downsized.

In the directional coupler (1) according to a sixth mode, in the fourth mode, the line width (do) of the main line (2) is larger than the line width (d1 to d3) of at least one sub line among the first sub line (31), the second sub line (32), and the third sub line (33) in plan view from the thickness direction (D1) of the multilayer substrate (8).

According to this configuration, in plan view from the thickness direction (D1) of the multilayer substrate (8), the line width (d0) of the main line (2) can be made larger. Therefore, in plan view from the thickness direction (D1), the gap (Q1) between the longest sub line (32) disposed on the outer side of the main line (2) and the shortest sub line (31) disposed on the inner side of the main line (2) can be made larger. Thus, electromagnetic-field coupling between the longest sub line (32) and the shortest sub line (31) can be suppressed.

In the directional coupler (1) according to a seventh mode, in the sixth mode, the main line (2) includes the first main line (21) and the second main line (22) connected to each other in series. Each of the first main line (21) and the second main line (22) includes the line portion formed in a looped shape. The line portions of the first main line (21) and the second main line (22) are respectively provided to different dielectric layers among the plurality of dielectric layers (81 to 86).

According to this configuration, the main line (2) can be configured as the two-layer structure including the first main line (21) and the second main line (22). Thus, impedance of the main line (2) can easily be controlled.

In the directional coupler (1) according to an eighth mode, in the seventh mode, the first main line (21) and the second main line (22) respectively have the first distances (R21 and R22) different from each other.

According to this configuration, the first distances (R21 and R22) of the first main line (21) and the second main line (22) can be controlled separately. Thus, impedance of the main line (2) can easily be controlled.

The directional coupler (1) according to a ninth mode further includes, in any one of the first to eighth modes, the first switch (5 and 6) connected between two sub lines among the first sub line (31), the second sub line (32), and the third sub line (33).

According to this configuration, the first switch (5 and 6) can control the line length of the sub line (3) constituted of the first to third sub lines (33). Therefore, it is possible to deal with a plurality of frequency bands corresponding to the line length of the sub line (3).

The directional coupler (1) according to a tenth mode further includes, in the ninth mode, the IC chip (9 and 58) including the first switch (5 and 6). The IC chip (9 and 58) is provided to one of the first principal surface (8*s*) and the second principal surface (8*t*) of the multilayer substrate (8 and 57). Each of the main line (2), the first sub line (31), the second sub line (32), and the third sub line (33) at least partially overlaps with the IC chip (9 and 58) in plan view from the thickness direction (D1) of the multilayer substrate (8 and 57).

According to this configuration, the wiring conductor connecting the IC chip (9 and 58) to each of the lines (the main line (2) and the first to third sub lines (31 to 33)) can be shortened. As a result, occurrence of optional inductor in the wiring conductor connecting the IC chip (9 and 58) to each line can be suppressed.

The high-frequency module (100) according to an eleventh mode includes, in any one of the first to tenth modes, the directional coupler (1), the antenna terminal (130), and the signal path (S0). The signal path (S0) leads to the antenna terminal (130). The main line (2) of the directional coupler (1) constitutes the partial section of the signal path (S0).

According to this configuration, the high-frequency module (100) capable of detecting, by the directional coupler (1), a high-frequency signal flowing in the signal path (S0) leading to the antenna terminal (130) can be provided. Further, the high-frequency module (100) which can achieve the above-described operation and effects of the directional coupler (1) can be provided.

The high-frequency module (100) according to a twelfth mode includes the directional coupler (1) according to the tenth mode, the antenna terminal (130), the plurality of filters (61 to 64), and the second switch (55). The second switch (55) switches connection and disconnection between the first signal path (S0) leading to the antenna terminal (130) and each of the plurality of second signal paths (S1 to S4) respectively leading to the plurality of filters (61 to 64). The IC chip (58) further includes the second switch (55).

According to this configuration, the IC chip 58 includes the first switch (5 and 6) and the second switch (55). Therefore, the first switch (5 and 6) and the second switch (55) can be disposed together into one position. As a result, the high-frequency module (100) can be downsized.

The communication device (200) according to a thirteenth mode includes the high-frequency module (100) according to the eleventh or twelfth mode and the signal processing circuit (210). The signal processing circuit (210) is connected to the high-frequency module (100) and is configured to process a high-frequency signal.

According to this configuration, the communication device (20) provided with the high-frequency module (100) having the above-described operation and effects can be provided.

What is claimed is:

1. A directional coupler comprising:

a main line;

a first sub line, a second sub line, and a third sub line; and a multilayer substrate comprising a plurality of dielectric layers, wherein the multilayer substrate has a first principal surface and a second principal surface opposed to each other, wherein the first sub line and the second sub line are connected to each other in series, wherein the second sub line and the third sub line are connected to each other in series, wherein each of the main line, the first sub line, the second sub line, and the third sub line comprises a portion having a loop shape in plan view from a thickness direction of the multilayer substrate, wherein the portions of the main line, the first sub line, the second sub line, and the third sub line are respectively in different ones of the plurality of dielectric layers, wherein in each of the first sub line, the second sub line, the third sub line, and the main line, a longest distance from an outer periphery to a center of gravity is a first distance, wherein the first distances of the first sub line, the second sub line, and the third sub are different from each other, and wherein the sub line having the longest first distance and the sub line having the shortest first distance are on a first principal surface side of the main line, and the sub line having an intermediate first distance is on a second principal surface side of the main line, the intermediate first distance being longer than the shortest first distance and shorter than the longest first distance.

2. The directional coupler according to claim 1, wherein the sub line having the longest first distance and the sub line having the shortest first distance do not overlap with each other in a line-width direction thereof in plan view from the thickness direction of the multilayer substrate.

3. The directional coupler according to claim 1, wherein the main line and the sub line having the intermediate first distance at least partially overlap with each other in a longitudinal direction thereof in plan view from the thickness direction of the multilayer substrate.

4. The directional coupler according to claim 1, wherein in plan view from the thickness direction of the multilayer substrate:

the outer periphery of the sub line having the longest first distance is farther from the center of gravity than the outer periphery of the main line, an inner periphery of the sub line having the longest first distance is farther from the center of gravity than an inner periphery of the main line, and the sub line having the longest first distance and the main line overlap each other.

5. The directional coupler according claim 4, wherein a line width of the main line is larger than a line width of the first sub line, the second sub line, or the third sub line in plan view from the thickness direction of the multilayer substrate.

6. The directional coupler according claim 5, wherein the main line comprises a first main line and a second main line connected to each other in series, wherein each of the first main line and the second main line comprises a portion having a loop shape, and wherein the portions of the first main line and the second main line are on different ones of the plurality of dielectric layers.

7. The directional coupler according claim 6, wherein the first distances of the first main line and the second main line are different from each other.

8. The directional coupler according to claim 1, wherein the main line, the first sub line, the second sub line, and the third sub line are arranged concentrically in plan view from the thickness direction of the multilayer substrate.

9. The directional coupler according to claim 1, further comprising:

a first switch connected between two of the first sub line, the second sub line, and the third sub line.

10. The directional coupler according to claim 9, further comprising:

an integrated circuit (IC) chip comprising the first switch, wherein the IC chip is on the first principal surface or the second principal surface of the multilayer substrate, and each of the main line, the first sub line, the second sub line, and the third sub line at least partially overlaps with the IC chip in plan view from the thickness direction of the multilayer substrate.

11. A high-frequency module comprising:

the directional coupler according to claim 10;

an antenna terminal;

a plurality of filters; and a second switch configured to selectively connect a first signal path leading to the antenna terminal to each of a plurality of second signal paths respectively leading to the plurality of filters, wherein the IC chip further comprises the second switch.

12. A high-frequency module comprising:

the directional coupler according to claim 1;

an antenna terminal; and a signal path leading to the antenna terminal, wherein the main line of the directional coupler constitutes a partial section of the signal path.

13. A communication device comprising:

the high-frequency module according to claim 12; and a signal processing circuit connected to the high-frequency module and configured to process a high-frequency signal.

* * * * *